(12) United States Patent
Kawasaki et al.

(10) Patent No.: US 7,965,351 B2
(45) Date of Patent: Jun. 21, 2011

(54) PLANAR LIGHT SOURCE, DISPLAY DEVICE AND METHOD FOR MANUFACTURING THE SAME

(75) Inventors: Osamu Kawasaki, Mihara (JP); Taiji Morimoto, Onomichi (JP); Masanori Watanabe, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 356 days.

(21) Appl. No.: 12/335,916

(22) Filed: Dec. 16, 2008

(65) Prior Publication Data

US 2009/0168406 A1 Jul. 2, 2009

(30) Foreign Application Priority Data

Dec. 27, 2007 (JP) ................... 2007-338331

(51) Int. Cl.
*G02F 1/1335* (2006.01)
*G09F 13/04* (2006.01)
*G09F 13/08* (2006.01)
(52) U.S. Cl. .............. 349/69; 349/61; 349/68; 362/97.2
(58) Field of Classification Search ................ 349/68–71
See application file for complete search history.

(56) References Cited

U.S. PATENT DOCUMENTS

| 7,460,103 | B2 * | 12/2008 | Konno et al. | 345/102 |
|---|---|---|---|---|
| 7,677,750 | B2 * | 3/2010 | Jeon et al. | 362/97.3 |
| 7,810,947 | B2 * | 10/2010 | Ueno et al. | 362/231 |
| 2005/0184952 | A1 * | 8/2005 | Konno et al. | 345/102 |
| 2006/0208262 | A1 * | 9/2006 | Sakuma et al. | 257/79 |
| 2007/0008740 | A1 | 1/2007 | Lee et al. | |
| 2007/0138932 | A1 * | 6/2007 | Morioka et al. | 313/485 |
| 2007/0200121 | A1 | 8/2007 | Lankhorst et al. | |
| 2007/0242459 | A1 * | 10/2007 | Nishigaki | 362/276 |
| 2008/0123022 | A1 * | 5/2008 | Aoki et al. | 349/68 |
| 2008/0231166 | A1 * | 9/2008 | Su | 313/498 |
| 2009/0051642 | A1 * | 2/2009 | Huang et al. | 345/102 |
| 2009/0122232 | A1 * | 5/2009 | Seki | 349/68 |
| 2009/0153028 | A1 * | 6/2009 | Hirosaki | 313/503 |
| 2009/0267879 | A1 * | 10/2009 | Masuda | 345/88 |

FOREIGN PATENT DOCUMENTS

| JP | 2005-235847 | 9/2005 |
|---|---|---|
| JP | 2007-080530 | 3/2007 |
| JP | 2007-227389 | 9/2007 |

* cited by examiner

*Primary Examiner* — Rhonda S Peace
(74) *Attorney, Agent, or Firm* — Morrison & Foerster LLP

(57) ABSTRACT

Light-emitting elements are divided into chromaticity groups on the basis of their chromaticity. In a planar light source, light-emitting elements selected from two of the chromaticity groups are alternately provided in a longitudinal direction and in a transverse direction, respectively. The two chromaticity groups are substantially equally away from a target chromaticity in directions reverse to each other. Further, pairs of two of the light-emitting elements belonging to the two chromaticity groups which are separated from each other, are provided so that distances $d_2$ at which two of the light-emitting elements in each of the pairs are provided are less than distances $d_1$ at which the pairs are provided.

21 Claims, 27 Drawing Sheets

FIG. 7(a)

| 1 | -1 | 1 | -1 | 1 | -1 | 1 | -1 |
|---|---|---|---|---|---|---|---|
| -1 | 1 | -1 | 1 | -1 | 1 | -1 | 1 |
| 1 | -1 | 1 | -1 | 1 | -1 | 1 | -1 |
| -1 | 1 | -1 | 1 | -1 | 1 | -1 | 1 |
| 1 | -1 | 1 | -1 | 1 | -1 | 1 | -1 |
| -1 | 1 | -1 | 1 | -1 | 1 | -1 | 1 |

FIG. 7(b)  %

| 25 | -12.5 | 12.5 | -12.5 | 12.5 | -12.5 | 12.5 | -25 |
|---|---|---|---|---|---|---|---|
| -12.5 | 0 | 0 | 0 | 0 | 0 | 0 | 12.5 |
| 12.5 | 0 | 0 | 0 | 0 | 0 | 0 | -12.5 |
| -12.5 | 0 | 0 | 0 | 0 | 0 | 0 | 12.5 |
| 12.5 | 0 | 0 | 0 | 0 | 0 | 0 | -12.5 |
| -25 | 12.5 | -12.5 | 12.5 | -12.5 | 12.5 | -12.5 | 25 |

FIG. 7(c)  %

| 40 | -30 | 30 | -30 | 30 | -30 | 30 | -40 |
|---|---|---|---|---|---|---|---|
| -30 | 20 | -20 | 20 | -20 | 20 | -20 | 30 |
| 30 | -20 | 20 | -20 | 20 | -20 | 20 | -30 |
| -30 | 20 | -20 | 20 | -20 | 20 | -20 | 30 |
| 30 | -20 | 20 | -20 | 20 | -20 | 20 | -30 |
| -40 | 30 | -30 | 30 | -30 | 30 | -30 | 40 |

FIG. 8(a)

| 1 | -1 | 0.5 | -0.5 | 1 | -1 | 0.5 | -0.5 |
|---|----|-----|------|---|----|-----|------|
| -1 | 1 | -0.5 | 0.5 | -1 | 1 | -0.5 | 0.5 |
| 1 | -1 | 0.5 | -0.5 | 1 | -1 | 0.5 | -0.5 |
| -1 | 1 | -0.5 | 0.5 | -1 | 1 | -0.5 | 0.5 |
| 1 | -1 | 0.5 | -0.5 | 1 | -1 | 0.5 | -0.5 |
| -1 | 1 | -0.5 | 0.5 | -1 | 1 | -0.5 | 0.5 |

FIG. 8(b) (%)

| 25 | -18.8 | 0 | 0 | 18.75 | -18.8 | 0 | -12.5 |
|----|-------|---|---|-------|-------|---|-------|
| -12.5 | 6.25 | 6.25 | -6.25 | -6.25 | 6.25 | 6.25 | 6.25 |
| 12.5 | -6.25 | -6.25 | 6.25 | 6.25 | -6.25 | -6.25 | -6.25 |
| -12.5 | 6.25 | 6.25 | -6.25 | -6.25 | 6.25 | 6.25 | 6.25 |
| 12.5 | -6.25 | -6.25 | 6.25 | 6.25 | -6.25 | -6.25 | -6.25 |
| -25 | 18.75 | 0 | 0 | -18.8 | 18.75 | 0 | 12.5 |

FIG. 8(c) (%)

| 40 | -35 | 10 | -10 | 35 | -35 | 10 | -20 |
|----|-----|----|-----|----|-----|----|-----|
| -30 | 25 | -5 | 5 | -25 | 25 | -5 | 15 |
| 30 | -25 | 5 | -5 | 25 | -25 | 5 | -15 |
| -30 | 25 | -5 | 5 | -25 | 25 | -5 | 15 |
| 30 | -25 | 5 | -5 | 25 | -25 | 5 | -15 |
| -40 | 35 | -10 | 10 | -35 | 35 | -10 | 20 |

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 8-2 | 7-3 | 7-3 | 6-4 | 6-4 | 6-4 | 6-4 | 6-4 | 6-4 | 6-4 | 6-4 | 6-4 | 6-4 | 7-3 | 7-3 | 8-2 |
| 2 | 8-2 | 7-3 | 7-3 | 6-4 | 6-4 | 5-5 | 5-5 | 5-5 | 5-5 | 5-5 | 5-5 | 6-4 | 6-4 | 7-3 | 7-3 | 8-2 |
| 3 | 8-2 | 7-3 | 7-3 | 6-4 | 6-4 | 5-5 | 5-5 | 5-5 | 5-5 | 5-5 | 5-5 | 6-4 | 6-4 | 7-3 | 7-3 | 8-2 |
| 4 | 8-2 | 7-3 | 7-3 | 6-4 | 6-4 | 5-5 | 5-5 | 5-5 | 5-5 | 5-5 | 5-5 | 6-4 | 6-4 | 7-3 | 7-3 | 8-2 |
| 5 | 8-2 | 7-3 | 7-3 | 6-4 | 6-4 | 5-5 | 5-5 | 5-5 | 5-5 | 5-5 | 5-5 | 6-4 | 6-4 | 7-3 | 7-3 | 8-2 |
| 6 | 8-2 | 7-3 | 7-3 | 6-4 | 6-4 | 5-5 | 5-5 | 5-5 | 5-5 | 5-5 | 5-5 | 6-4 | 6-4 | 7-3 | 7-3 | 8-2 |
| 7 | 8-2 | 7-3 | 7-3 | 6-4 | 6-4 | 6-4 | 6-4 | 6-4 | 6-4 | 6-4 | 6-4 | 6-4 | 6-4 | 7-3 | 7-3 | 8-2 |
| 8 | 8-2 | 7-3 | 7-3 | 6-4 | 6-4 | 6-4 | 6-4 | 6-4 | 6-4 | 6-4 | 6-4 | 6-4 | 6-4 | 7-3 | 7-3 | 8-2 |
| 9 | 8-2 | 8-2 | 8-2 | 8-2 | 8-2 | 8-2 | 8-2 | 8-2 | 8-2 | 8-2 | 8-2 | 8-2 | 8-2 | 8-2 | 8-2 | 8-2 |

| R7 | G7 | B7 |
|----|----|----|
| R6 | G6 | B6 |
| R5 | G5 | B5 |
| R4 | G4 | B4 |
| R3 | G3 | B3 |

FIG. 25 (a)

| R7 | G7 |    |
|----|----|----|
|    |    |    |
|    |    |    |
|    |    |    |
|    |    | B3 |

+

|    |    | B7 |
|----|----|----|
|    |    |    |
|    |    |    |
|    |    |    |
| R3 | G3 |    |

FIG. 25 (b)

| R7 | G7 |    |
|----|----|----|
|    |    |    |
|    |    |    |
|    |    | B4 |
|    |    |    |

+

|    |    |    |
|----|----|----|
|    |    | B6 |
|    |    |    |
|    |    |    |
| R3 | G3 |    |

FIG. 25 (c)

| R7 |    |    |
|----|----|----|
|    | G6 |    |
|    |    |    |
|    |    |    |
|    |    | B3 |

+

|    |    | B7 |
|----|----|----|
|    |    |    |
|    |    |    |
|    | G4 |    |
| R3 |    |    |

PLANAR LIGHT SOURCE, DISPLAY DEVICE AND METHOD FOR MANUFACTURING THE SAME

This Nonprovisional application claims priority under U.S.C. §119(a) on Patent Application No. 338331/2007 filed in Japan on Dec. 27, 2007, the entire contents of which are hereby incorporated by reference.

FIELD OF THE INVENTION

The present invention relates to (i) a planar light source using an LED which planar light source can be for use in, for example indicator, illumination or displaying, (ii) a display device such as a liquid crystal display device using the planar light source and (iii) a method for manufacturing the planar light source and the display device.

BACKGROUND OF THE INVENTION

With a rapid progress of LED techniques, especially, techniques for a blue LED (light-emitting diode) which is a III nitride semiconductor light-emitting element, a white LED (hereinafter referred to as "light-emitting element") which is a combination of a blue LED and a fluorescent substance (e.g. yellow fluorescent substance) has been put into practical use. The white LED has a luminous efficiency (efficiency of conversion of electricity to light) higher than an incandescent lamp, and is expected to become, in the future, an energy saving light source having a luminous efficiency higher than a fluorescent lamp.

It is possible to realize a planar light source by mounting a plurality of light-emitting elements on a substrate. The planar light source can be used as an illumination light source or a backlight for a non-light-emitting display device such as a liquid crystal display device. Japanese Patent Application Publication Tokukai No. 2007-227389 (published on Sep. 6, 2007, and hereinafter referred to as Patent Document 1) discloses a liquid crystal display device including a backlight in which blue, green and red LEDs are provided on a back side of a liquid crystal display panel. A method thus using three-color LEDs has the advantage of widening a color reproducibility region of a liquid crystal display device, whereas has the disadvantage of a necessity of increase in the distance between the backlight and the liquid crystal display panel so that a good mixture of the three colors is realized in the liquid crystal display panel. In contrast, when a white LED (light-emitting element) composed of a blue LED and a fluorescent substance is used as a backlight, it is possible to realize a good color mixture even if the backlight is provided to be close to the liquid crystal display panel. Such a flat display device can be suitably used as a wall-hung display and a portable display. However, when the backlight is provided to be close to the liquid crystal display panel, the influence due to production tolerance of the light-emitting elements themselves comes out. This causes in-plane distribution of chromaticity to become visible.

Japanese Patent Application Publication Tokukai No. 2007-80530 (published on Mar. 29, 2007, and hereinafter referred to as Patent Document 2) discloses an LED illumination device using a white LED, in which a color mixture is substantially the same as a target chromaticity coordinate e of white. For example, according to the LED illumination device disclosed in Patent Document 2, (i) a group of white LEDs in which x and y of chromaticity coordinates (x, y) are larger than the target chromaticity coordinates e and (ii) a group of white LEDs in which x and y of the chromaticity coordinates (x, y) are smaller than the target chromaticity coordinates e are combined so that a mixed color has the chromaticity close to the target chromaticity coordinates e.

However, the LED illumination device disclosed in Patent Document 2 still has the following problems to be solved.

First, in a planar light source in which light-emitting elements are provided two-dimensionally, unevenness of color and unevenness of luminous intensity must be fully restrained.

Second, when the planar light source in which the light-emitting elements are provided two-dimensionally is used as a backlight of a liquid crystal display device or the like, unevenness of color and unevenness of luminous intensity of the light-emitting elements must be fully restrained in a display panel provided near a backlight. In other words, a flat display device must be realized in which the backlight can be provided close to the display panel.

Third, a method which is directed to a combination of light-emitting elements and which is suitable for reducing in-plane distribution must be provided.

Fourth, a displaying method suitable for a display device using a planar light source whose in-plane distribution is reduced must be provided.

Fifth, the utilization ratio (yield) of light-emitting elements used in a planar light source must be improved.

SUMMARY OF THE INVENTION

An object of the present invention is to provide a planar light source which can effectively restrain unevenness of color and unevenness of luminous intensity, and to provide a flat display device in which unevenness of color and unevenness of luminous intensity are restrained even if the distance between a backlight and a display panel is reduced.

In order to attain the above object, the planar light source of the present invention is a planar light source including a plurality of light-emitting elements, wherein: each of the plurality of light-emitting elements is comprised of a combination of a semiconductor light-emitting element for emitting primary light and fluorescent substances for absorbing the primary light and emitting secondary light having a longer wavelength than the primary light, each of the plurality of light-emitting elements emitting combination light of the primary light and the secondary light, said each of the plurality of light-emitting elements, provided in at least a partial area of the planar light source, belongs to a first chromaticity group or a second chromaticity group on a basis of chromaticity of the combination light, (i) a difference between chromaticity of light-emitting elements belonging to the first chromaticity group and a target chromaticity and (ii) a difference between chromaticity of light-emitting elements belonging to the second chromaticity group and the target chromaticity are substantially equal and are away from the target chromaticity in directions reverse to each other, respectively, and the light-emitting elements belonging to the first chromaticity group and the light-emitting elements belonging to the second chromaticity group are alternately provided, in said at least a partial area, in a longitudinal direction and a transverse direction, respectively.

In order to attain the above object, another planar light source of the present invention is a planar light source comprising a plurality of light-emitting elements, wherein: each of the plurality of light-emitting elements is comprised of a combination of a semiconductor light-emitting element for emitting primary light and fluorescent substances for absorbing the primary light and emitting secondary light having a longer wavelength than the primary light, each of the plurality of light-emitting elements emitting combination light of the primary light and the secondary light, said each of the plurality of light-emitting elements, provided in at least a partial area of the planar light source, belongs to a first chromaticity group or a second chromaticity group on a basis of chromaticity of the combination light, (i) a difference between chromaticity of light-emitting elements belonging to the first chromaticity group and a target chromaticity and (ii) a difference between chromaticity of light-emitting elements belonging to the second chromaticity group and the target chromaticity are substantially equal and are away from the target chromaticity in directions reverse to each other, respectively, and pairs of two of the light-emitting elements belonging to the first and second chromaticity groups, respectively are provided so that intervals at which two of the light-emitting elements in each of the pairs are provided are less than 0.5 times as long as intervals at which the pairs are provided.

The display device of the present invention is a display device including any one of the planar light sources described in the above arrangements and a display panel for displaying an image by driving a plurality of passive pixels, the planar light source illuminating the display panel.

A method for manufacturing a planar light source of the present invention includes the steps of: preparing a plurality of light-emitting elements, measuring light emitted from the light-emitting elements via red, green and blue filters, dividing the light-emitting elements into red, green and blue luminescence intensity groups, for each luminescence intensity group, based on differences between their luminescence intensity and target luminescence intensity, respectively, and alternately providing light-emitting elements selected from two of the plurality of luminescence intensity groups in a longitudinal direction and in a transverse direction, respectively, the light-emitting elements being selected in a manner such that differences between luminescence intensity of the light-emitting elements and the target luminescence intensity are substantially equal and are away from the target luminescence intensity in directions reverse to each other, respectively.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 7 ($a$) through 7 ($c$) are explanatory views each showing a planar arrangement rule 1.

FIGS. 8 ($a$) through 8 ($c$) are explanatory views each showing a planar arrangement rule 2.

FIG. 9 is a top view of a backlight device of Embodiment 1.

FIG. 24 is a view explaining how light-emitting elements in Embodiment 5 are divided into groups.

FIGS. 25 ($a$) through 25 ($c$) are explanatory views each showing combinations of the light-emitting elements in Embodiment 5.

DESCRIPTION OF THE EMBODIMENTS

Embodiment 1

Explained in the present embodiment is (i) a planar light source in which light-emitting elements are provided in accordance with a predetermined planar arrangement rule so that unevenness of chromaticity and unevenness of luminous intensity are restrained and (ii) a display device using the planar light source.

(Light-Emitting Element)

Figure 1:
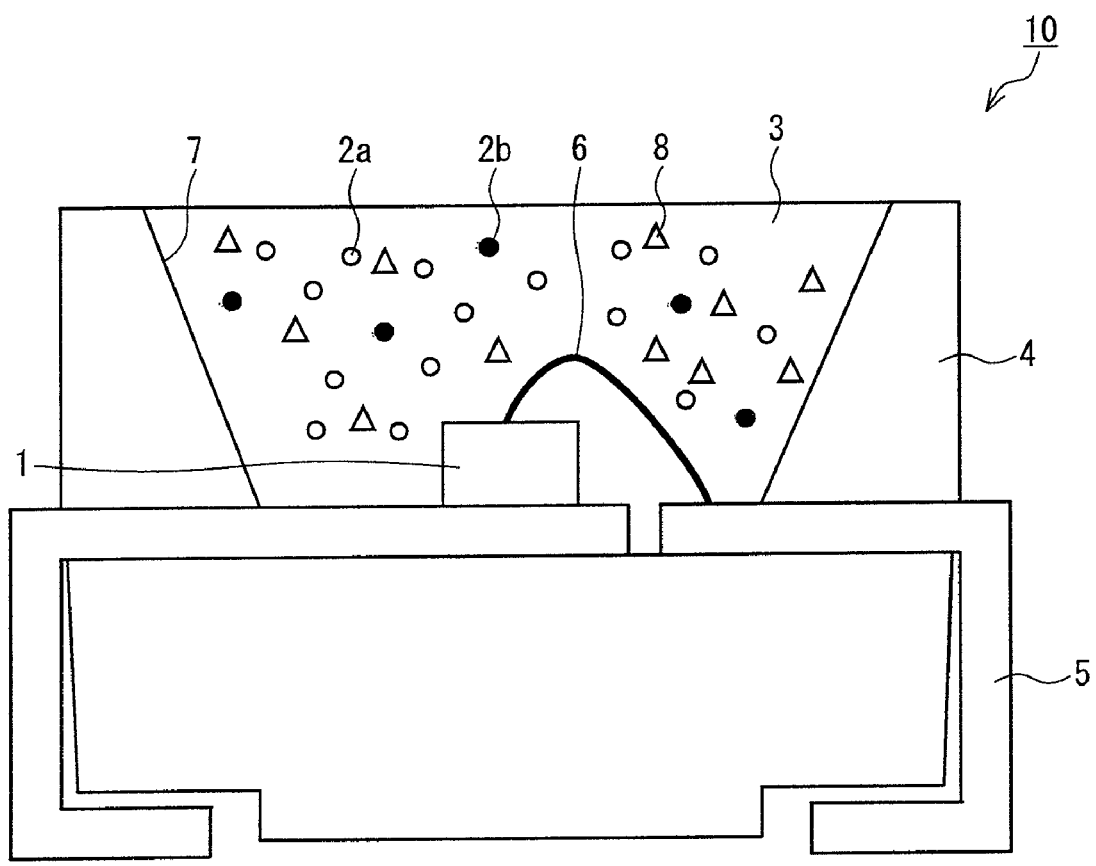
FIG. 1 is a cross-sectional view of a light-emitting element used in Embodiment 1.

FIG. 1 is a cross-sectional view of a light-emitting element 10 of the present embodiment. In the light-emitting element 10, a semiconductor light-emitting element 1 is die-bonded to a frame 4 including a concavity having a reflection surface 7 and is sealed by a resin 3. Fluorescent substances 2 are, in advance, dispersed in the resin 3. The light-emitting element 10 is designed so that (i) when primary light emitted from the semiconductor light-emitting element 1 passes through the resin 3, the fluorescent substances 2 are partially excited by the primary light and are converted into secondary light, and (ii) the primary light and the secondary light are combined so as to be emitted as substantially white light.

The semiconductor light-emitting element 1 is a GaN semiconductor light-emitting element including a conductive substrate. A bottom surface electrode is provided on a bottom surface of the conductive substrate, and a top surface electrode is provided on a surface which is on the opposite side of the bottom surface. The light emitted from the semiconductor light-emitting element 1 has a peak wavelength of 457 nm which is a wavelength of the blue light.

The frame 4 is formed by inserting a pair of lead frames 5 into a nylon material. Ends of the lead frames 5 are exposed in the bottom surface of the concavity of the frame 4, and are provided so as to be separated from each other. Further, the other ends of the lead frames 5, serving as external terminals, are cut off to a predetermined length, and are folded along an external wall of the frame 4.

On the bottom surface of the concavity of the frame 4, the semiconductor light-emitting element 1 is die-bonded to the end of one of the lead frames 5 with the use of a brazing filler material, so as to be fixed to a predetermined position. Further, the top surface electrode of the semiconductor light-emitting element 1 and the end of the other lead frame 5 are wire-bonded by a wire 6 so that the semiconductor light-emitting element 1 and the lead frame 5 are electrically connected.

In order for the light to efficiently be emitted, a reflection film 7 is preferably a metal film including silver or aluminum.

Used as the fluorescent substances 2 are a combination of green fluorescent substances 2a (e.g. Eu-activated β-sialon) for emitting green (emission peak wavelength of not less than 500 nm and not more than 550 nm) secondary light and red fluorescent substances 2b (e.g. $CaAlSiN_3$: Eu) for emitting red (emission peak wavelength of not less than 600 nm and not more than 780 nm) secondary lights. This makes it possible to obtain a three-wavelength type light-emitting elements having high color rendering properties. Instead, it is possible to use, as the fluorescent substances 2, yellow fluorescent substances (e.g. Ce: YAG, BOSE (Ba, Sr, O, Eu), Eu-activated α-sialon) for emitting yellow (emission peak wavelength of approximately 560 nm) secondary light. In this case, blue primary light and yellow secondary light are combined, and therefore a so-called quasi-white light-emitting element can be obtained. It should be noted that even the yellow fluorescent substances have green components and red components in addition to yellow components.

The resin 3 is required to have high durability to the primary light having a short wavelength. In view of this, silicon resin is preferably used.

In order to prevent sedimentation of the fluorescent substances 2, a sedimentation suppression member 8 such as silica fine particles can be mixed in the resin 3. This makes it possible to suppress the influence of the sedimentation of the fluorescent substances 2 even if time required to harden the resin 3 is not uniform. It is preferable that the fluorescent substances 2a and 2b are kept to be evenly dispersed in the resin 3. By mixing the sedimentation suppression member 8, it is possible to prevent production tolerance and unevenness of color of the emitted light due to unevenness of the fluorescent substances 2a and 2b.

Figure 2:
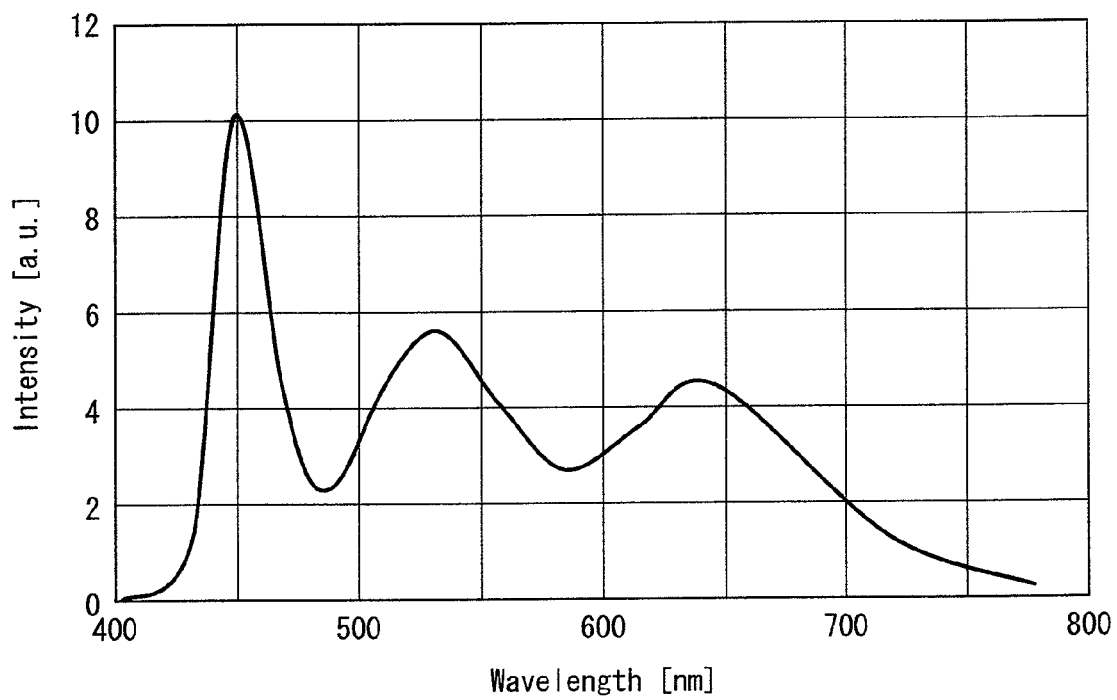
FIGS. 2 ($a$) and 2 ($b$) are graphs each showing a spectral distribution of the light-emitting element used in Embodiment 1.
Figure 2:
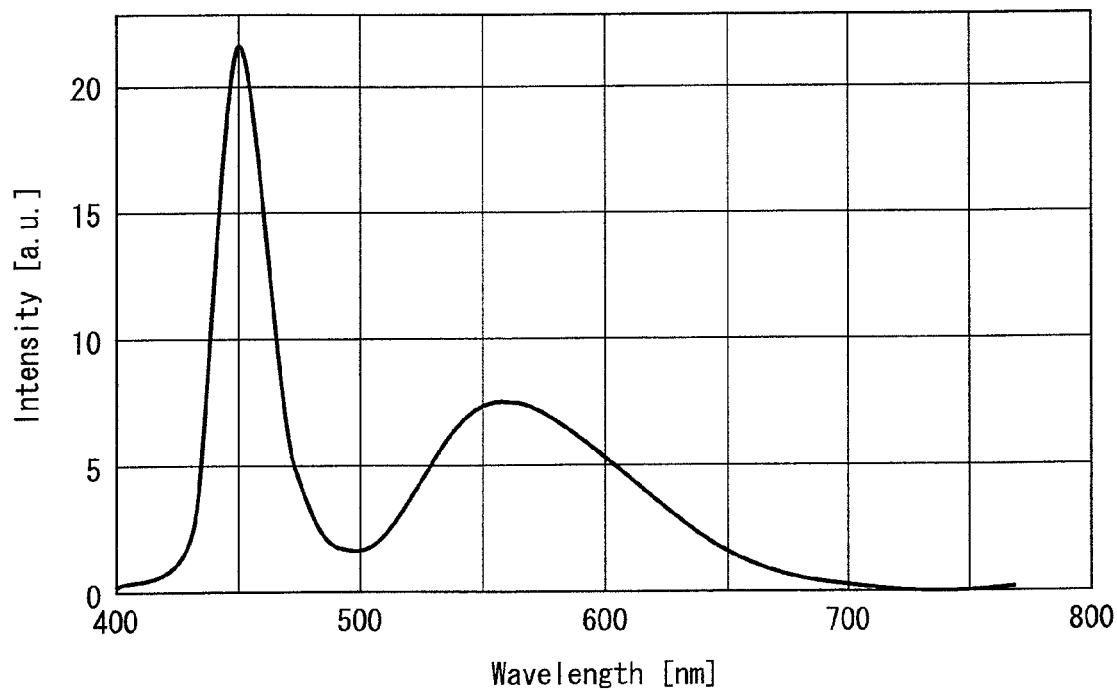

FIG. 2 (a) is a graph showing a spectral distribution of a three-wavelength type light-emitting element. The distribution has three peaks at wavelength of blue, green and red light. FIG. 2 (b) is a graph showing a spectral distribution of a quasi-white light-emitting element. The distribution has two peaks at wavelength of blue and yellow light.

Figure 3:
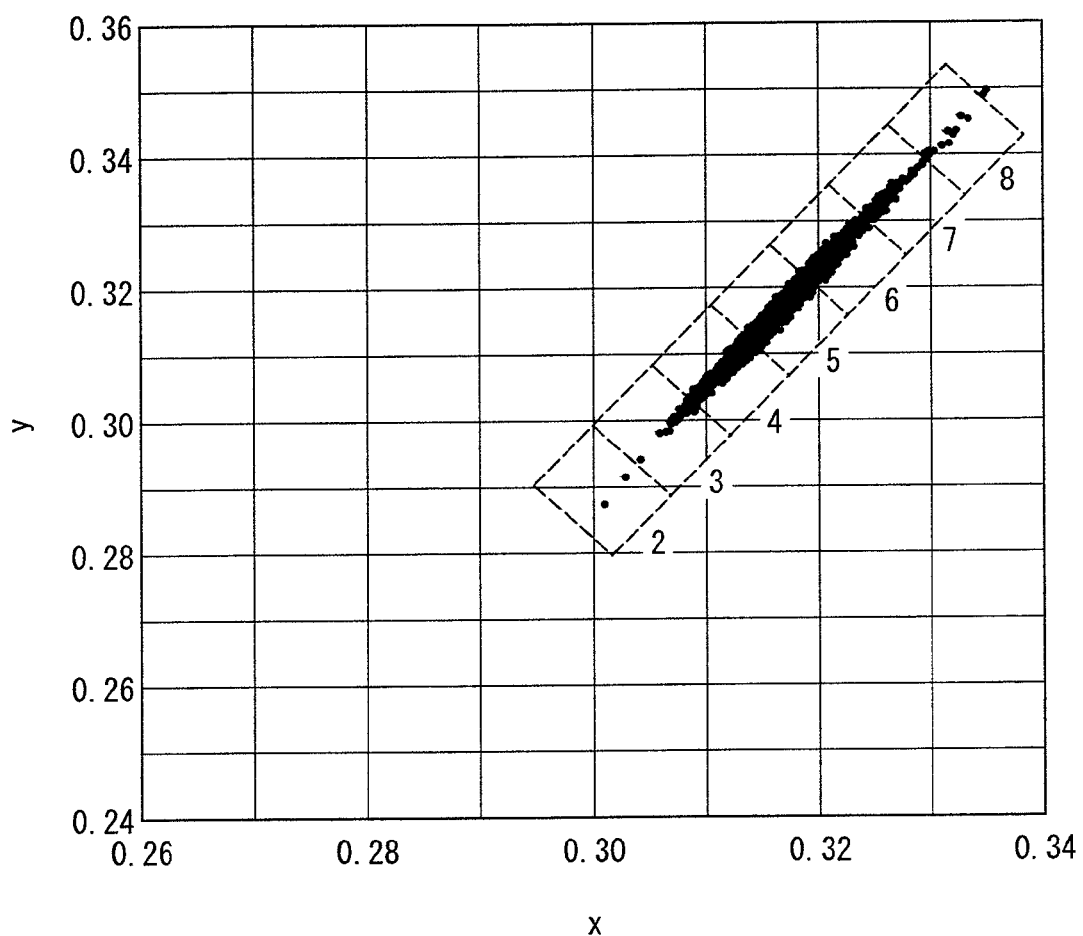
FIG. 3 is a chromaticity diagram showing a chromaticity distribution of a population of the light-emitting elements used in Embodiment 1.

FIG. 3 is a chromaticity diagram showing a chromaticity distribution of a population of light-emitting elements belonging to a single mold lot. As shown in FIG. 3, in a single mold lot, the chromaticity has a one-dimensional distribution in the chromaticity diagram. One of the contributing factors causing this unevenness in chromaticity is unevenness of density of the fluorescent substances 2a and 2b. If the densities of the fluorescent substances 2a and 2b are high, the chromaticity (x, y) approaches the chromaticity of the fluorescent substances 2a and 2b. Whereas, if the densities of the fluorescent substances 2a and 2b are low, the chromaticity (x, y) approaches the chromaticity of the semiconductor light-emitting element 1. Unevenness of sedimentation of the fluorescent substances can cause a phenomenon similar to unevenness of chromaticity due to the density dependency of the fluorescent substances. The sedimentation suppression member 8 has an effect of restraining the unevenness of chromaticity caused by the sedimentation of the fluorescent substances.

Although two fluorescent substances, that is, the fluorescent substances 2a and 2b are used, the chromaticity has a one-dimensional distribution (see FIG. 3). It can be presumed that this is because the densities of the two fluorescent substances change in a similar manner.

Figure 5:
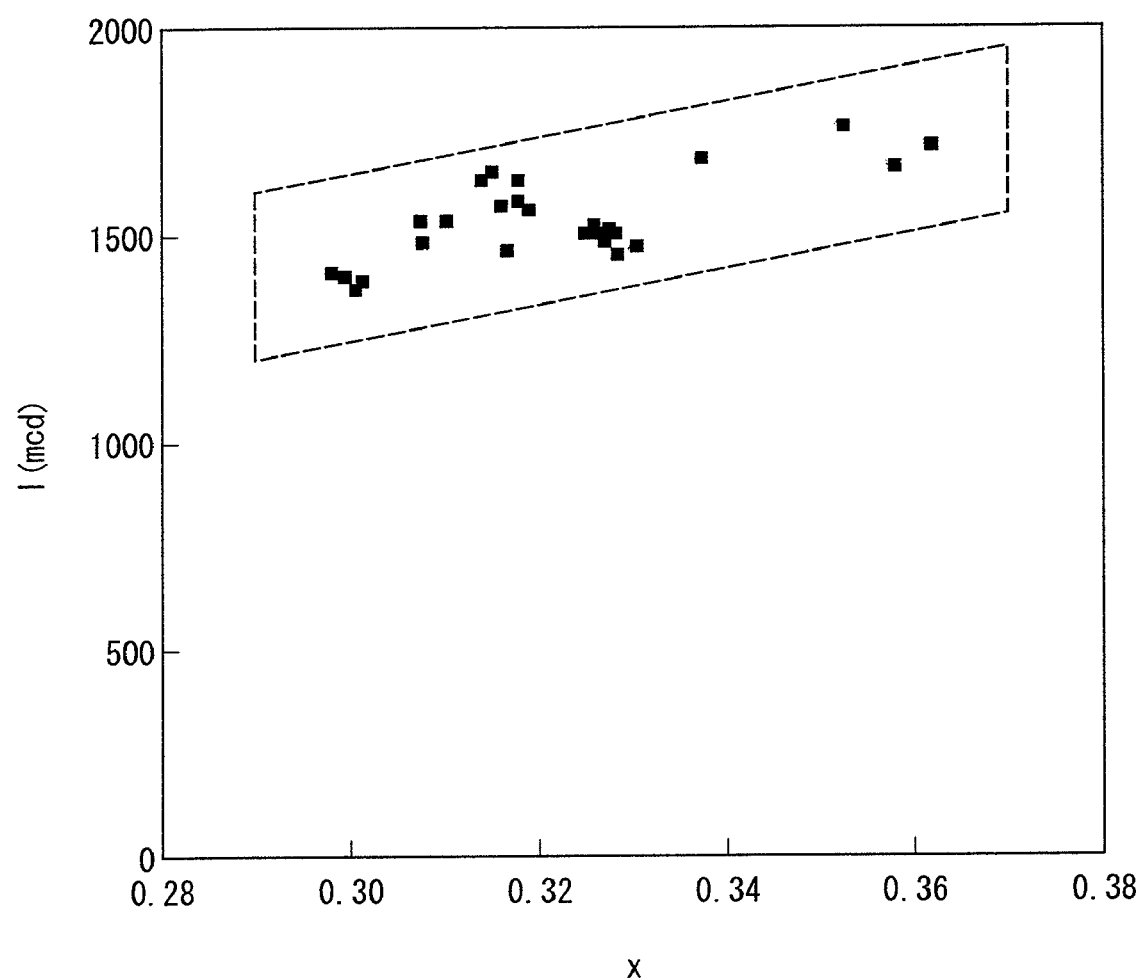
FIG. 5 is a graph showing an example of relationship between chromaticity and luminous intensity of a light-emitting element.

A plurality of light-emitting elements are subjected to measurements of their chromaticity and their axial luminous intensity (brightness), and ones of the light-emitting elements having luminous intensity falling within a certain range are selected as the light-emitting element 10. FIG. 5 is a graph showing an example of relationship between chromaticity and luminous intensity of a light-emitting element. As shown in FIG. 5, there is a tendency that the larger the chromaticity x becomes, the higher the luminous intensity becomes. Therefore, it is more preferable that the allowable luminous intensity range shifts toward a higher range as the chromaticity (or color temperature) becomes higher, as compared with a case in which an allowable luminous intensity range stays constant over the whole area of the chromaticity x. That is, it is preferable to set the allowable luminous intensity range as shown by the parallelogram of FIG. 5. Each chromaticity of the light-emitting elements is divided into seven chromaticity groups of "2", "3", "4", "5", "6", "7" and "8" shown in FIG. 3.

(Planar Light Source)

Figure 4:
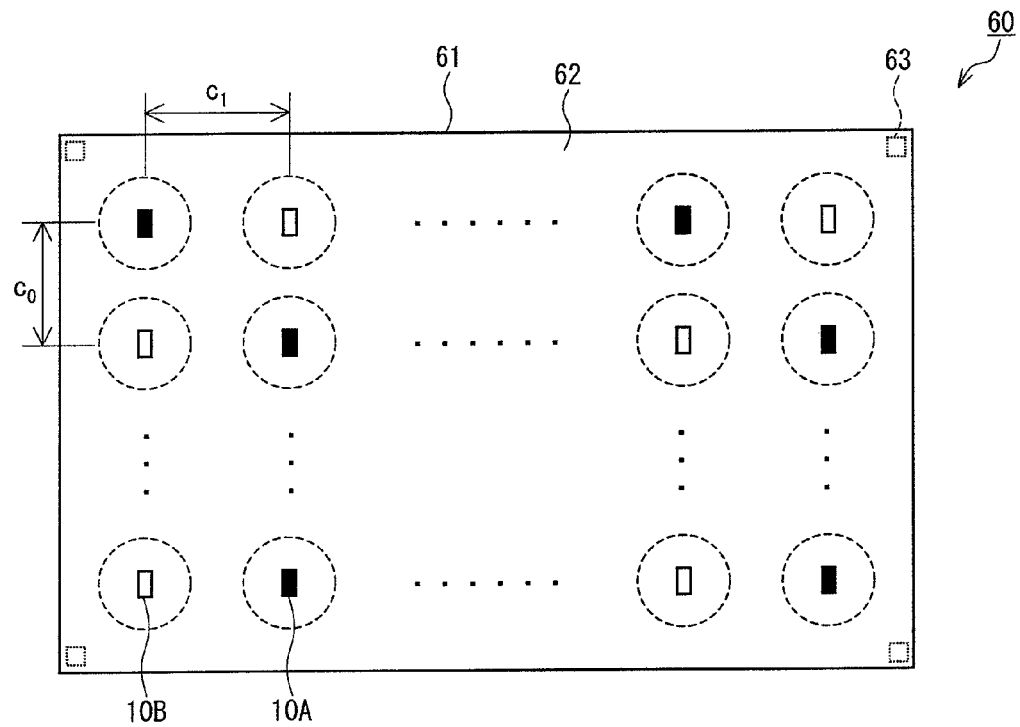
FIG. 4 ($a$) is a top view showing how a planar light source is arranged in Embodiment 1 and FIG. 4 ($b$) is a cross-sectional view of a liquid crystal display device using the planar light source.
Figure 4:
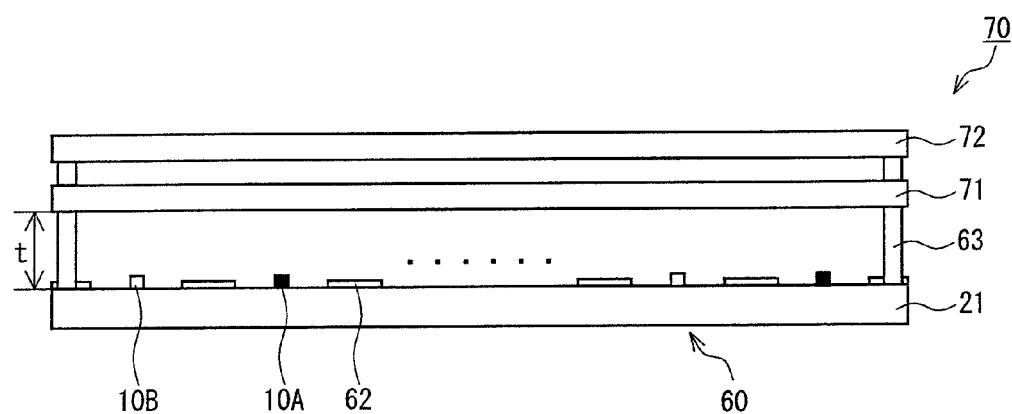

FIG. 4 (a) is a top view showing how a planar light source 60 is arranged in the present embodiment. According to the planar light source 60, a plurality of light-emitting elements 10A and 10B are provided on a surface of a mounting substrate 61. The light-emitting elements 10A and the light-emitting elements 10B are explained in detail in the following description of planar arrangement rules. The light-emitting elements 10A and the light-emitting elements 10B are alternately provided at intervals of $C_1$ in a transverse direction and at intervals of $C_0$ in a longitudinal direction, respectively. A reflection sheet 62 from which parts where the light-emitting elements 10A and the light-emitting elements 10B are provided are removed is attached onto the mounting substrate 61. Further, posts 63 for supporting a diffusion plate 71 and a liquid crystal display panel 72 are provided in the four corners of the mounting substrate 61. The diffusion plate 71 and the liquid crystal display panel 72 are later described.

FIG. 4 (b) is a cross-sectional view of a liquid crystal display device 70 using the planar light source 60. The liquid crystal display device 70 includes the diffusion plate 71 provided so as to keep a distance t from the planar light source 60, and the liquid crystal display panel 72 provided above the diffusion board 71.

The planar light source 60 used in the present embodiment can be used as a backlight of a passive display device (a display device, including a display panel for displaying an image by driving a plurality of passive pixels modulating the light from a backlight device, which is not self-luminous) other than a liquid crystal display device.

(Planar Arrangement Rule)

In order to reduce unevenness of color of a planar light source, the inventors of the present invention studied the following planar arrangement rules and evaluated the in-plane distribution of unevenness of color, by the use of light-emitting elements which are divided into a plurality of chromaticity groups as shown in FIG. 3.

Figure 6:
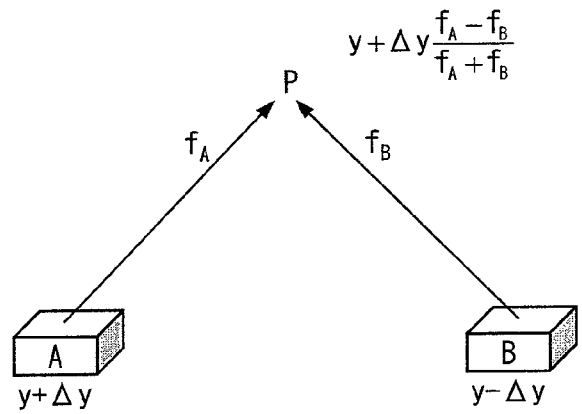
FIGS. 6 ($a$) through 6 ($c$) are explanatory views each showing how a chromaticity unevenness parameter at a point P above a light-emitting element A can be expressed.
Figure 6:
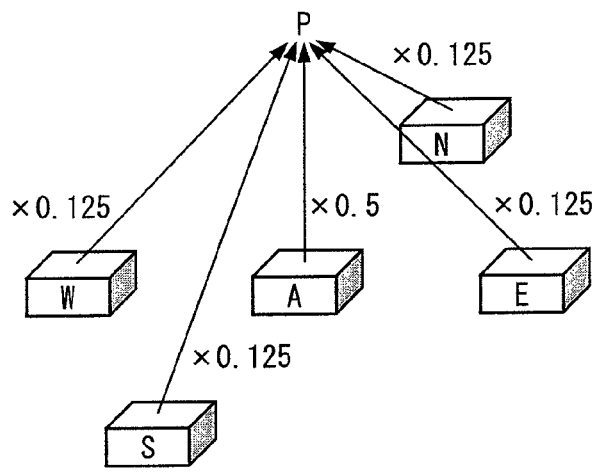
Figure 6:
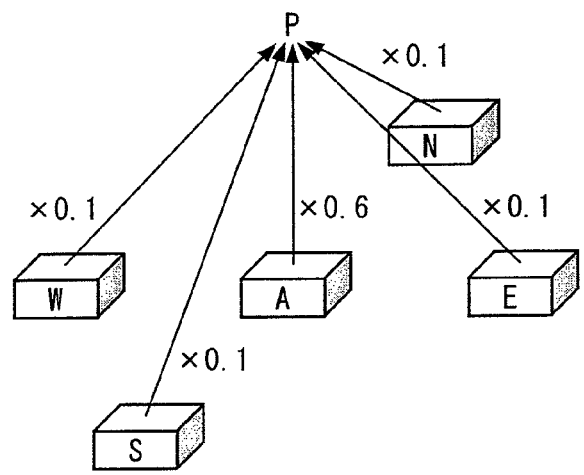

FIG. 6 (a) is an explanatory view showing how the chromaticity at the point P can be expressed when a light-emitting element A having the chromaticity (y+Δy) and a light-emitting element B having the chromaticity (y−Δy) are combined (the chromaticity at the point P can be expressed in the same manner when the chromaticity y is replaced by the chromaticity x or color temperature T). Note that it is assumed that whole luminous flux of the light-emitting element A is the same as that of the light-emitting element B, a difference in visibility between the chromaticity (y+Δy) and the chromaticity (y−Δy) is not considered, and transfer functions of luminous intensity of the light-emitting element A and the light-emitting element B are $f_A$ and $f_B$, respectively. As shown in FIG. 6 (a), unevenness of chromaticity at the point P can be expressed as F·Δy, where $F=(f_A-f_B)/(f_A+f_B)$. It follows that the unevenness of chromaticity becomes F times smaller. The same is true in a case of a plurality of light-emitting elements. Hereinafter, F is referred to as a "chromaticity unevenness parameters".

FIG. 6 (b) is a view showing another calculation method, where a transfer function f of the light-emitting element A is 0.5, and each transfer function f of four light-emitting elements N, S, E and W which adjoin the light-emitting element A is 0.125. FIG. 6 (c) is a view showing a further calculation method where a transfer function f of the light-emitting element A is 0.6, and each transfer function f of four light-emitting elements N, S, E and W which adjoin the light-emitting element A is 0.1. each of the light-emitting elements is nearer to the point P in FIG. 6 (c) than in FIG. 6 (b).

An example of a planar arrangement rule 1 is shown in FIG. 7 (a). FIG. 7 (a) is a schematic view of a planar light source in which light-emitting elements 10A belonging to a first chromaticity group "7" (chromaticity y+Δy) and light-emitting elements 10B belonging to a second chromaticity group "3" (chromaticity y−Δy) are alternately provided at regular intervals in the longitudinal and transverse directions, respectively.

FIG. 7 (b) shows an in-plane distribution (%) of the chromaticity unevenness parameters calculated by using the method shown in FIG. 6 (b), where a numeral value 1 is assigned to the chromaticity group "7", and a numeral value −1 is assigned to the chromaticity group "3". As is clear from FIG. 7 (b), the chromaticity unevenness parameters become 0% on the light-emitting elements except the light-emitting elements on the periphery of the planar light source. That is, almost no unevenness of color is caused. Similarly, the result calculated based on the method of FIG. 6 (c) is shown in FIG. 7 (c). In this case, the chromaticity unevenness parameters are 20% or −20% on the light-emitting elements except the light-emitting elements on the periphery of the planar light source. That is, the unevenness of chromaticity is ((x−0.2Δx, y−0.2Δy) through (x+0.2Δx, y+0.2Δy)) which is twenty percent of the original unevenness of chromaticity ((x−Δx, y−Δy) through (x+Δx, y+Δy)).

An example of a planar arrangement rule 2 is shown in FIG. 8 (a). FIG. 8 (a) is a schematic view of a planar light source in which light-emitting elements belonging to the first chromaticity group "7" (numerical value 1 is assigned), the second chromaticity group "3" (numerical value −1 is assigned), the third chromaticity group "6" (numerical value 0.5 is assigned) and the fourth chromaticity group "4" (numerical value −0.5 is assigned) are provided at regular intervals in the longitudinal and transverse directions, respectively. The result obtained by evaluating in-plane unevenness of this case by using the method of FIG. 6 (b) is shown in FIG. 8 (b). In this case, the chromaticity unevenness parameters are 6.25% or −6.25% on the light-emitting elements except the light-emitting elements on the periphery of the planar light source. Further, the evaluation result by using the method of FIG. 6 (c) is shown in FIG. 8 (c). In this case, the chromaticity unevenness parameters of 25% (maximum value) or −25% (minimum value) can be obtained on the respective light-emitting elements.

It should be noted that the chromaticity unevenness parameters of the planar arrangement rule 2 are slightly inferior to those of the planar arrangement rule 1 although the chromaticity groups "4" and "6" used in the planar arrangement rule 2 have smaller unevenness of chromaticity than the chromaticity groups "3" and "7" used in the planar arrangement rule 1.

The above study demonstrates that light-emitting elements are preferably selected from two chromaticity groups having similar chromaticity differences when light-emitting elements selected from chromaticity groups having chromaticity differences are provided in longitudinal and transverse directions so that the unevenness of chromaticity is reduced. Therefore, when a backlight device (planar light source) for use in a liquid crystal display device is realized by combining light-emitting elements belonging to various chromaticity groups, it is preferable that the light-emitting elements are provided in such a backlight device (planar light source) as shown in FIG. 9. FIG. 9 is a top view of the backlight device which is divided into nine vertical areas and sixteen horizontal areas. A plurality of light-emitting elements (1, 4, 9, 16 or 25 light-emitting elements) are used in each of the areas. The numeral values written in each of the areas of FIG. 9 indicate the chromaticity groups of light-emitting elements used in each of the areas. For example, "8-2" of FIG. 9 indicates the area in which the light-emitting elements belonging to the chromaticity groups "8" and "2" having large chromaticity differences are used, and "5-5" indicates the area in which the light-emitting elements belonging to the chromaticity group "5" having the same chromaticity are used. It is possible to obtain a good planar light source and a liquid crystal display device using the same, in which (i) the light-emitting elements having unevenness of chromaticity can be effectively used and (ii) the unevenness of color is hardly perceptible, when first through third areas are arranged as follows. The combinations "5-5" of the light-emitting elements belonging to the chromaticity group "5" having no chromaticity difference are used in the second area which is an area near the center (the area does not include corners) on which area a viewer fixes its eyes in a liquid crystal display device. The light-emitting elements belonging to the chromaticity groups "8-2" having large chromaticity differences are used in the first area which is an area near the periphery (the area includes corners), and the light-emitting elements belonging to the chromaticity groups "6-4" and "7-3" having smaller chromaticity differences than "8-2" are used in the third area which is an area between the area near the center and the area near the periphery.

Figure 10:
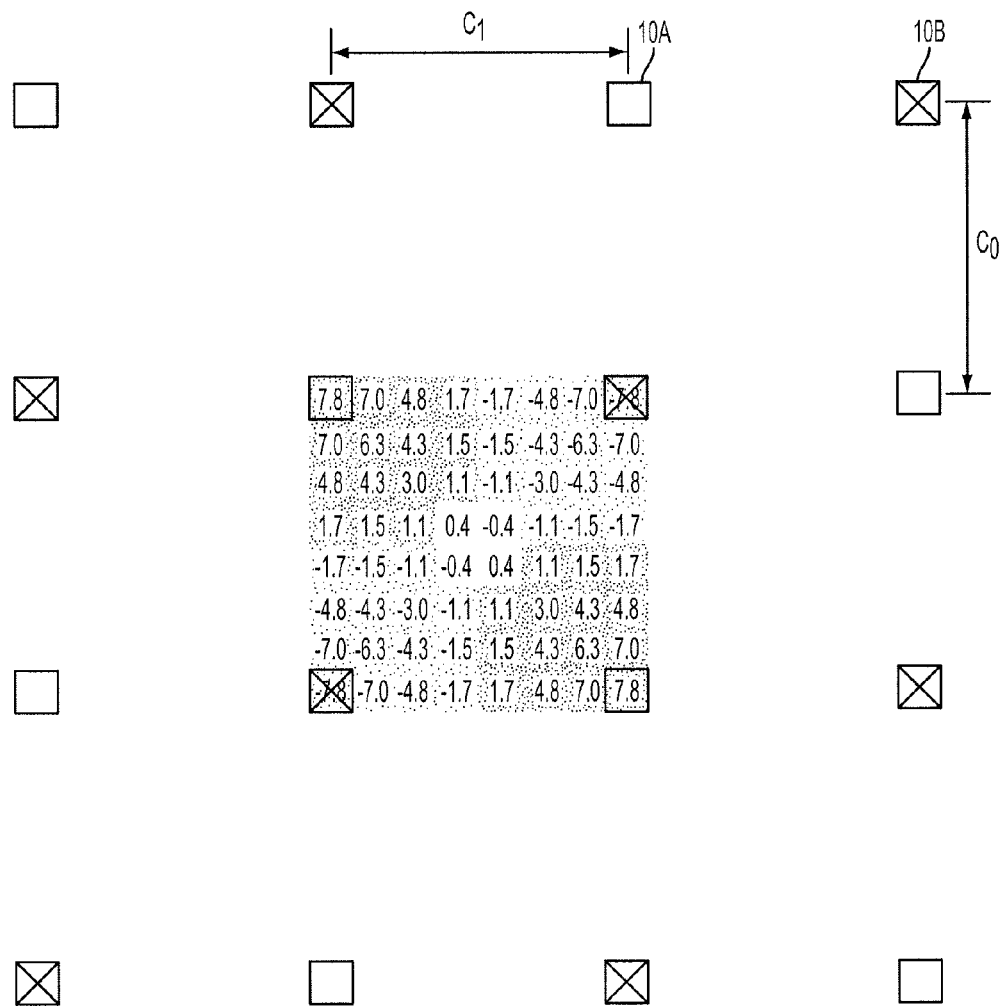
FIG. 10 is a view showing the result of two-dimensional simulation of chromaticity unevenness parameters in the planar arrangement rule 1.

FIG. 10 is a view showing a result of two-dimensional simulation of the chromaticity unevenness parameters obtained when the light-emitting element 10A having an unevenness of chromaticity of numeral value 1 and the light-emitting element 10B having an unevenness of chromaticity of numeral value −1 are alternately provided in the longitudinal and transverse directions in accordance with the planar arrangement rule 1. Note that the chromaticity unevenness parameters were obtained at the central area of 16 light-emitting elements provided in a matrix manner (4 rows and 4 columns), under the assumptions that (i) angle dependency of light emission distribution is lambertian (angle dependency of luminescence intensity is indicated by cos θ at an angle θ with a normal direction) and (ii) equations of $c_0 = c_1 = 0.7$ and $t = 0.84 (t/c_0 = 1.2)$ are satisfied The chromaticity unevenness parameters were −7.8% above the light-emitting element 10B and 7.8% above the light-emitting element 10A. It is clear that the unevenness of color is reduced drastically.

Figure 11:
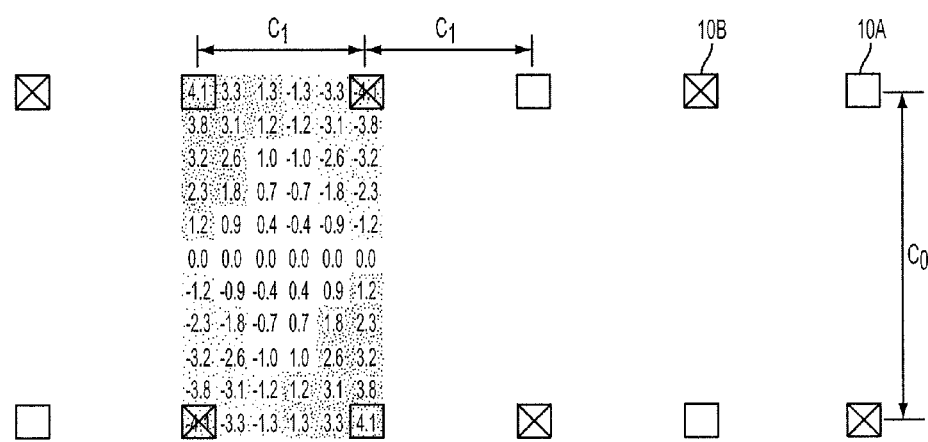
FIG. 11 is a view showing the result of two-dimensional simulation of chromaticity unevenness parameters in a planar arrangement rule 3.

FIG. 11 is a view showing a result of two-dimensional simulation of chromaticity unevenness parameters in the planar arrangement rule 3. In the planar arrangement rule 3, the chromaticity unevenness parameters were obtained at the central area of 32 light-emitting elements provided in a matrix manner (4 rows and 8 columns, and FIG. 11 show a part of the 32 light-emitting elements), under the assumptions that equations of $c_1$ (intervals in a transverse direction)=0.5, $c_0$ (intervals in a transverse direction)=1 and t=0.84 are satisfied Thus, the area density of the light-emitting elements of the planar arrangement rule 3 is the same as that of the planar arrangement rule 1.

The range in which the maximum value and the minimum value of the chromaticity unevenness parameters fall can be summarized as follows.

Planar Arrangement Rule 1 ±7.8% (FIG. 10)
Planar Arrangement Rule 3 ±4.1% (FIG. 11)

This shows that the unevenness of color can be reduced more in the planar arrangement rule 3 (the light-emitting elements are alternately provided in a rectangular shape where $c_1 < c_0$ is met) than in the planar arrangement rule 1 (the light-emitting elements are alternately provided in a square shape) which has the same area density of light-emitting elements as that of the planar arrangement rule 3.

Embodiment 2

The Embodiment 1 deals with a planar light source in which light-emitting elements belonging to respective chromaticity groups are provided at regular intervals in a transverse direction in accordance with the planar arrangement rule 1, 2 or 3. However, the present embodiment deals with a case where pairs of two light-emitting elements belonging to different chromaticity groups are provided so as to be adjacent to each other in accordance with a planar arrangement rule 4 or 5 so that in-plane unevenness of chromaticity is reduced. Further, the present embodiment deals with a liquid crystal display device 90 including a planar light source 80 having the above arrangement.

Figure 12:
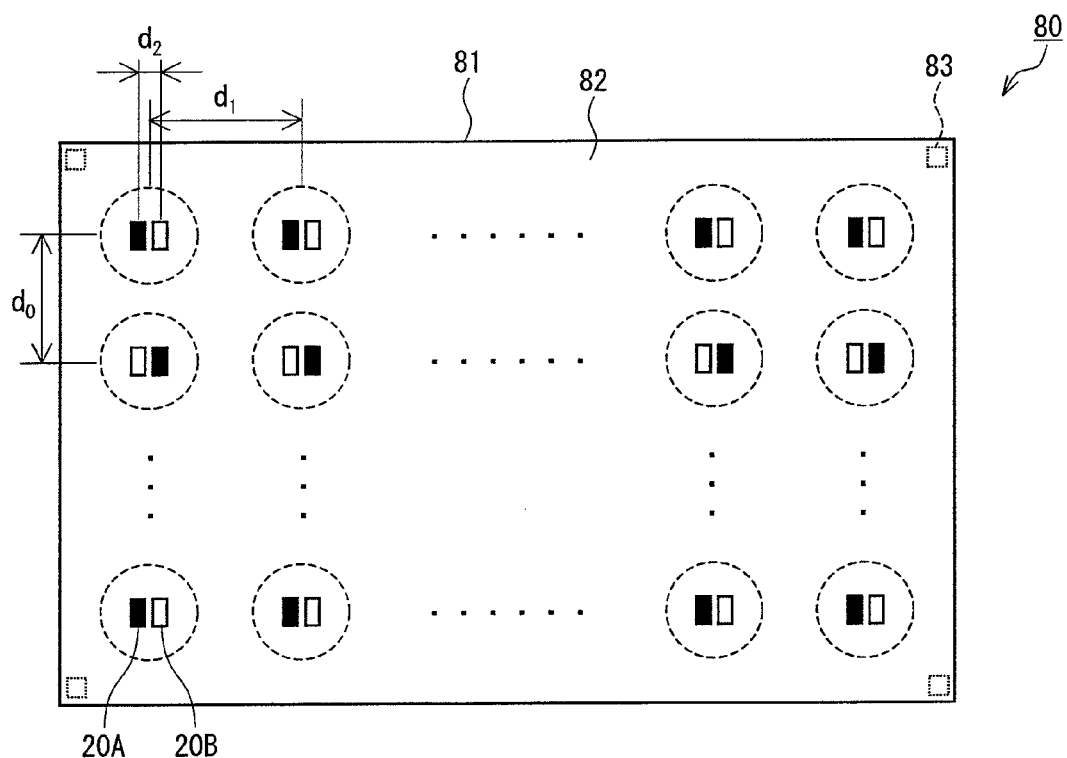
FIG. 12 ($a$) is a top view of a planar light source of Embodiment 2 and FIG. 12 ($b$) is a cross-sectional view of a display device.
Figure 12:
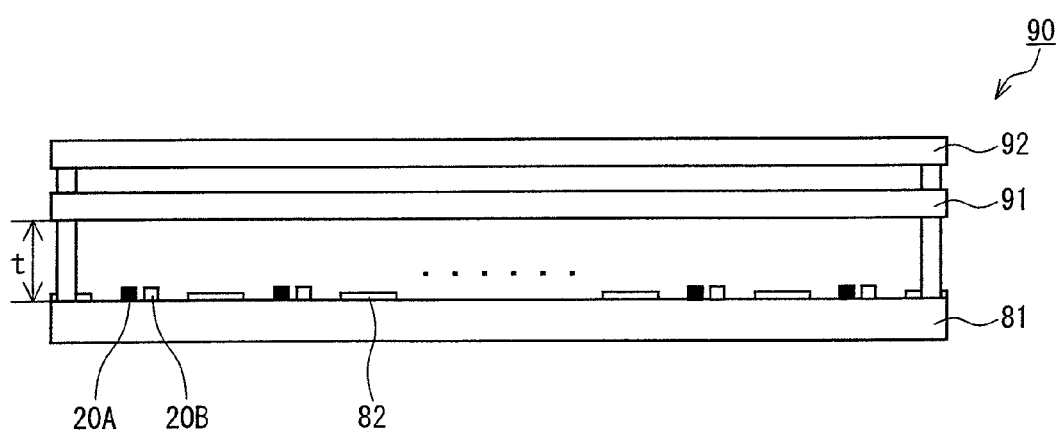

FIG. 12 (a) and FIG. 12 (b) are a top view and a cross-sectional view, respectively, showing an arrangement of a display device. The display device 90 includes the planar light source 80, a diffusion plate 91 provided so as to keep a distance t from the planar light source 80, and a liquid crystal display panel 92 provided above the diffusion plate 91. The planar light source 80 backlights the liquid crystal display panel 92. Posts 83 (later described) for supporting the diffusion plate 91 and the liquid crystal display panel 92 are provided in four corners of a mounting substrate 81. The diffusion plate 91 and the liquid crystal display panel 92 are described later.

(Light-Emitting Element)

Figure 13:
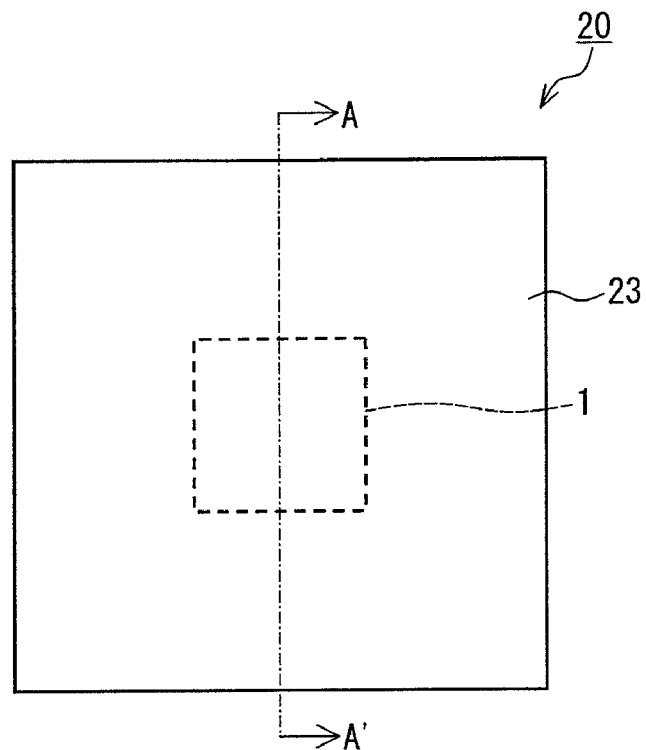
FIGS. 13 ($a$) and 13 ($b$) are a top view and a cross-sectional view, respectively, showing an arrangement of a light-emitting element used in Embodiment 2.
Figure 13:
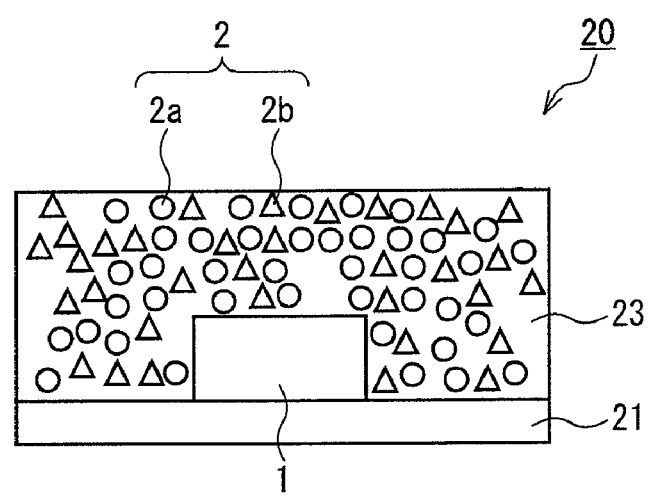

FIG. 13 (a) and FIG. 13(b) are a top view and a cross-sectional view, respectively, showing an arrangement of a light-emitting element 20 used in the present embodiment. The light-emitting element 20 includes a substrate 21 on which surface an electrode pattern is formed and the semiconductor light-emitting element 1. The semiconductor light-emitting element 1 is die-bonded on the electrode pattern and is sealed with a resin 23 in which the green fluorescent substances 2a and the red fluorescent substances 2b are dispersed. A package of the light-emitting element 20 is a rectangular parallelepiped.

The light-emitting element 20 has emission angle dependency of a spectral distribution. One of possible causes of this is the shape of the package. When the fluorescent substances 2 are evenly dispersed in the resin 23 sealing the semiconductor light-emitting element 1, short light path length along which primary light travels causes an increase in ratio of the primary light, whereas long light path length causes an increase in ratio of the secondary light. The light path length becomes long, when primary light is emitted by the semiconductor light-emitting element 1 in an oblique direction of the drawing, and is then emitted from a surface of the resin 3. This causes an increase in percentage of the secondary light to the primary light. Therefore, the present embodiment adopts a light-emitting element 20, in which the emission angle dependency of a spectral distribution is reduced by causing the light emitted by the semiconductor light-emitting element 1 to be emitted from a side surface of the resin 23 so that a change in light path length to the emission angle is reduced.

Figure 14:
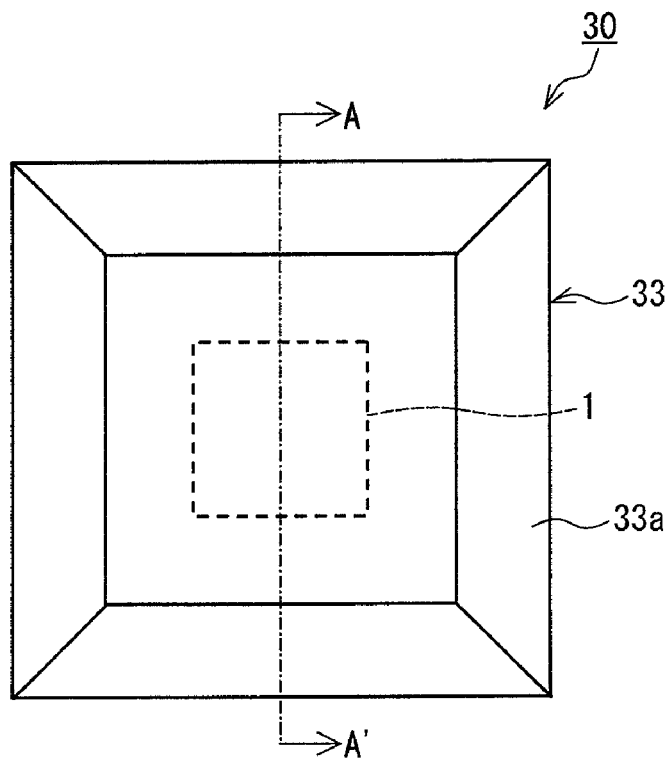
FIGS. 14 ($a$) and 14 ($b$) are a top view and a cross-sectional view, respectively, showing an arrangement of a light-emitting element which can be used in Embodiment 2.
Figure 14:
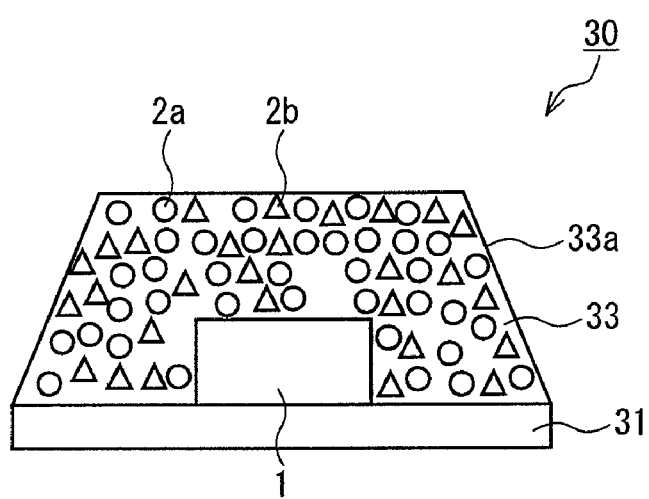

A light-emitting element 30 is arranged so that the change in spectral distribution due to the emission angle is further reduced. A top view and a cross-sectional view of this light-emitting element 30 are shown in FIGS. 14 (a) and 14 (b), respectively. The light-emitting element 30 includes a substrate 31 on which surface an electrode pattern is provided, and the semiconductor light-emitting element 1. The semiconductor light-emitting element 1 is die-bonded on the electrode pattern, and is sealed with resin 33 in which the green fluorescent substances 2a and the red fluorescent substances 2b are dispersed. A package of the light-emitting element 30 is a truncated pyramid. An inclination angle of an inclined surface 33a of the resin 33 is preferably 60°. With this shape, differences in light path lengths to the emission angle is reduced because the primary light, obliquely emitted by the semiconductor light-emitting element 1, partially passes through the inclined surface 33a. Therefore, it is possible to restrain the unevenness of color of the emitted light. Note that it is possible to form the shape of the package by using a method such as a molding method or a dicing method.

Figure 15:
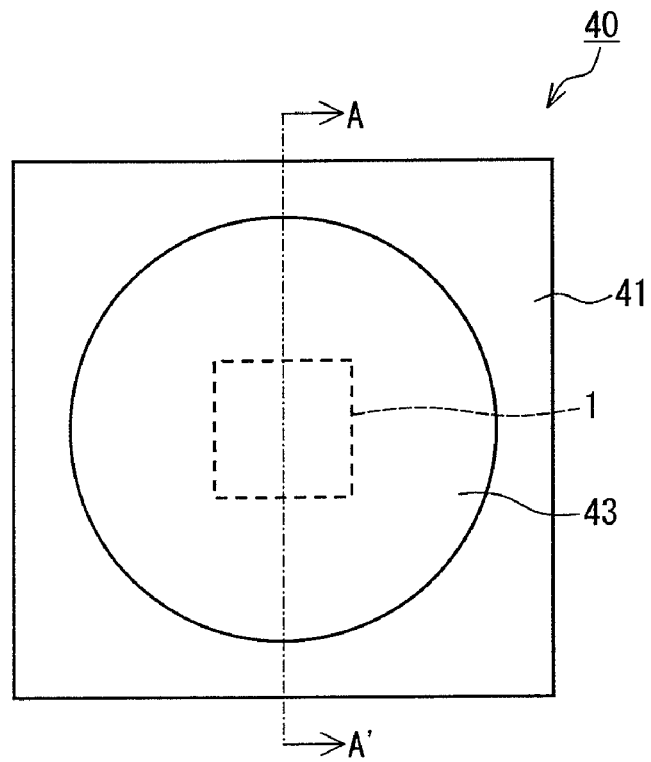
FIGS. 15 ($a$) and 15 ($b$) are a top view and a cross-sectional view, respectively, showing an arrangement of a light-emitting element which can be used in Embodiment 2.
Figure 15:
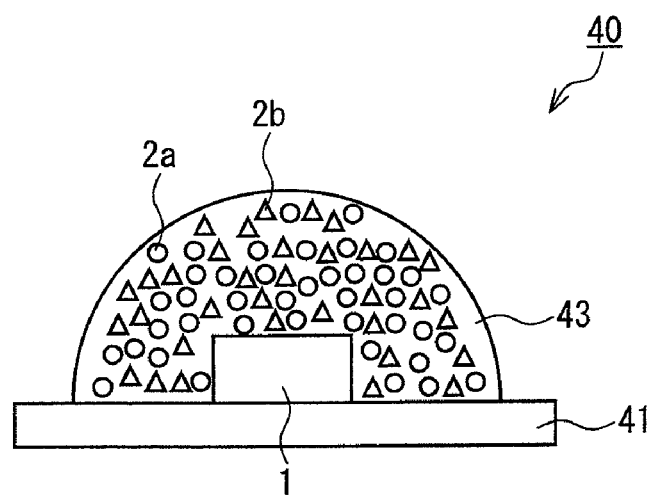

FIG. 15 (a) and FIG. 15 (b) are a top view and a cross-sectional view, respectively, showing an arrangement of a light-emitting element 40. In the light-emitting element 40, a package has a dome shape. With this shape, when the semiconductor light-emitting element 1 is considered as a point light source, the light path length along which the primary light travels in the resin 43 does not change because the semiconductor light-emitting element 1 is sealed with the resin 43 having a uniform thickness. Therefore, it is possible to restrain the unevenness of color of the emitted light. Note that it is possible to form the shape of the package by using a method such as a molding method.

In the present embodiment, it is possible to use any one of the light-emitting elements 10, 20, 30 and 40. Alternatively, it is possible that the semiconductor light-emitting element 1 is replaced with a semiconductor light-emitting element including two electrodes on its surface, and the electrodes are wire-bonded by two wires. The semiconductor light-emitting element can be subjected to flip chip mounting in which a pair of electrodes faces the frame 4 or the substrates 21, 31 and 41 and is then die-bonded by a conductive brazing filler material.

(Effect of Adjacently Paired Arrangement)

In the present embodiment, a planar light source is arranged such that (i) pairs of two light-emitting elements 20A and 20B belonging to different chromaticity groups are provided so as to keep a distance $d_2$ from each other and so as to be adjacent to each other, and (ii) adjacent two pairs are provided so as to keep a distance $d_1$ in the transverse direction and so as to keep a distance $d_0$ in the longitudinal direction (hereinafter referred to as "adjacently paired arrangement"). The effect of averaging the chromaticity distribution which is brought about by this arrangement is simulated as follows.

The result of two-dimensional simulation of chromaticity unevenness parameters in the planar arrangement rule 4 is shown in FIGS. 16 through 19. In the planar arrangement rule 4, pairs of the light-emitting elements 20A and 20B are provided so as to be adjacent to each other in the transverse direction, and adjacent two pairs in the longitudinal direction are provided so that an alignment of the light-emitting elements 20A and 20B in one of the adjacent two pairs is reverse to that in the other of the adjacent two pairs. In the simulation, an in-plane distribution was obtained in a case of 16 light-emitting elements provided in a matrix manner (4 rows and 4 columns) (second through fourth rows and second through fourth columns are shown in the drawings), under the assumptions that (i) angle dependency of luminescence intensity of the light-emitting elements 20A and 20B is lambertian, and (ii) equations of $d_0=d_1=1$ and $t=0.84$ are satisfied. In this case, two light-emitting elements exist, on average, in a 1×1 square. Therefore, the area density of the light-emitting elements is the same as that of the simulation shown in FIGS. 10 and 11.

Figure 16:
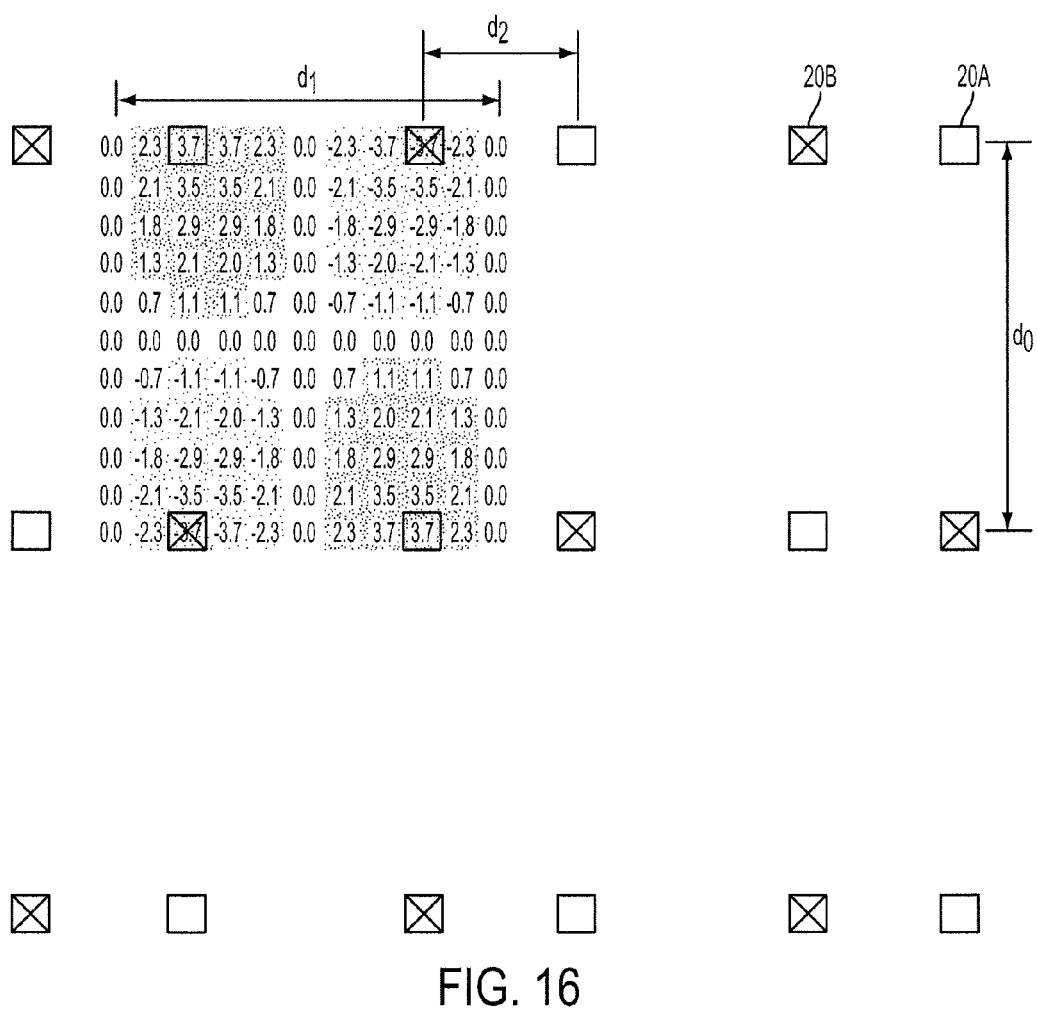
FIG. 16 is a view showing the result of two-dimensional simulation of chromaticity unevenness parameters in a planar arrangement rule 4 ($d_2/d_1=0.4$).
Figure 17:
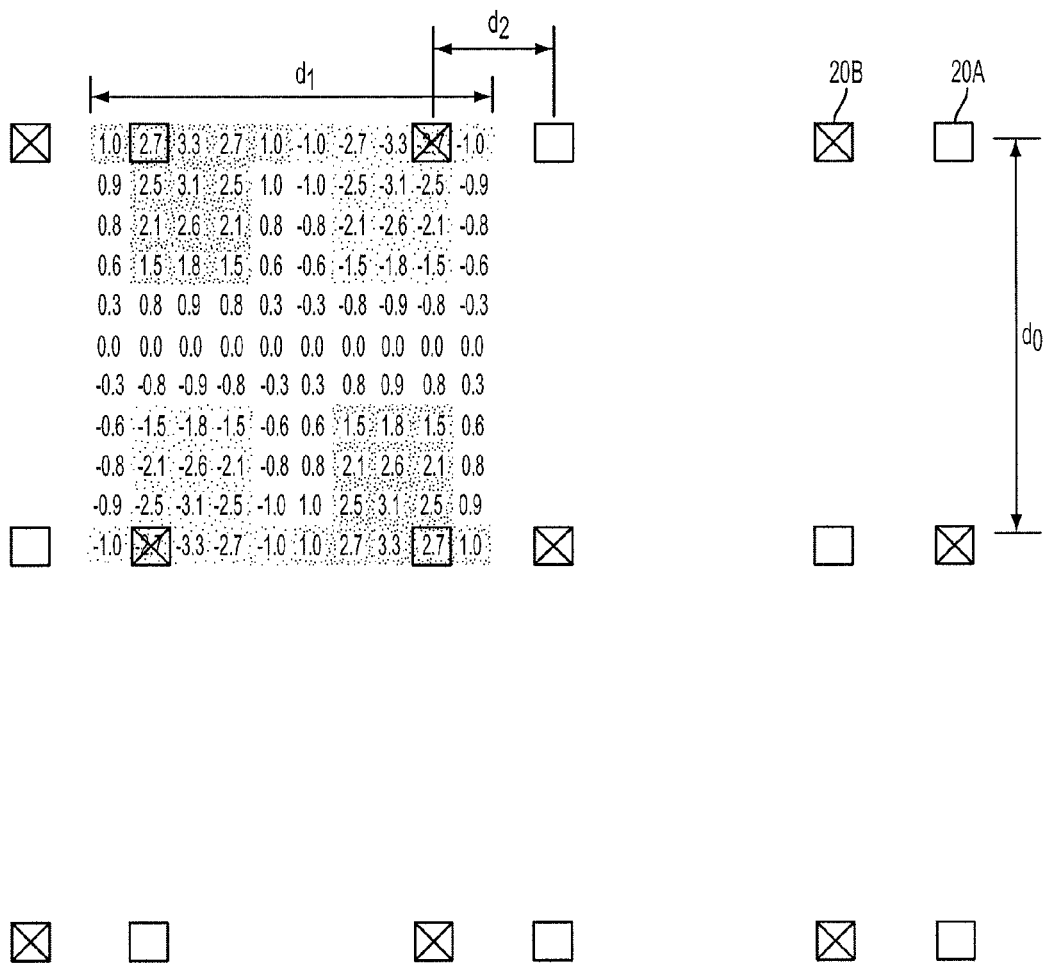
FIG. 17 is a view showing the result of two-dimensional simulation of chromaticity unevenness parameters in a planar arrangement rule 4 ($d_2/d_1=0.3$).
Figure 18:
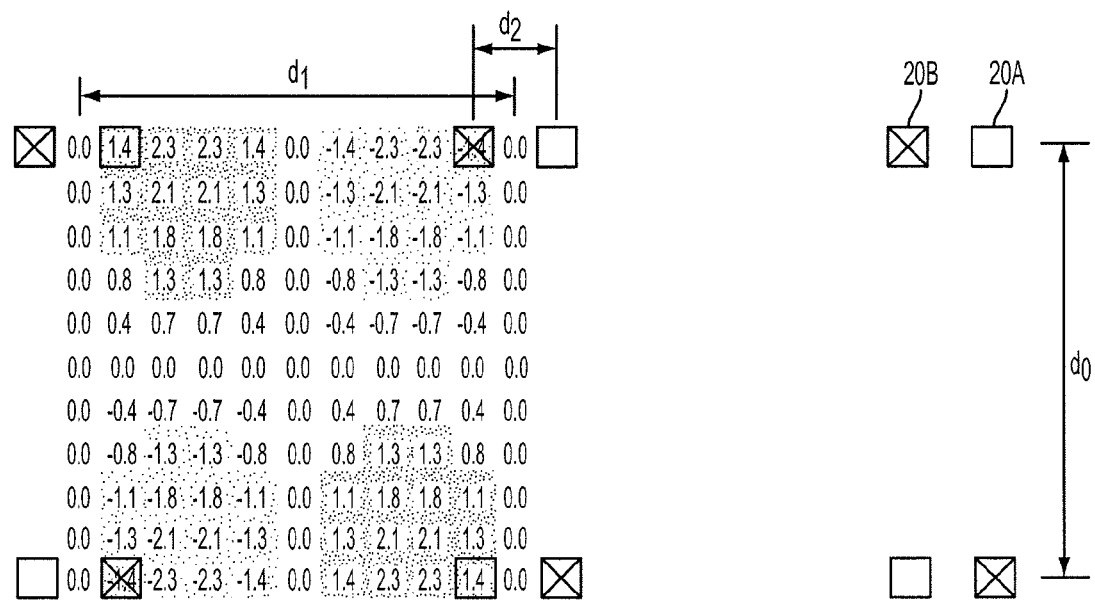
FIG. 18 is a view showing the result of two-dimensional simulation of chromaticity unevenness parameters in a planar arrangement rule 4 ($d_2/d_2=0.2$).
Figure 19:
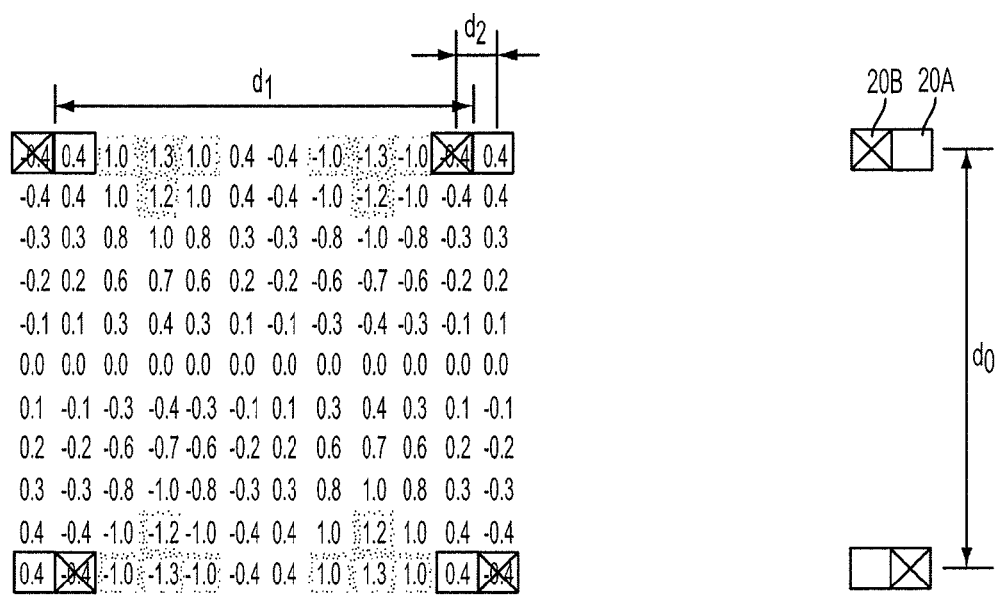
FIG. 19 is a view showing the result of two-dimensional simulation of chromaticity unevenness parameters in a planar arrangement rule 4 ($d_2/d_1=0.1$).

The distance $d_2$ between the light-emitting elements 20A and 20B was used as a parameter $d_2$ was set to $0.4d_1$ in FIG. 16, $d_2$ was set to $0.3d_1$ in FIG. 17, $d_2$ was set to $0.2d_1$ in FIG. 18, $d_2$ was set to $0.1d_1$ in FIG. 19. In the simulation, the chromaticity unevenness parameters were found, assuming that the light-emitting elements 20A have a numeral value 1 and the light-emitting elements 20B have a value −1.

The range in which the maximum value and the minimum value of the chromaticity unevenness parameters fall can be summarized as follows.

$c_1=0.5c_0\pm4.1\%$ (FIG. 11) (Reference)
$d_2=0.4d_1+3.7\%$ (FIG. 16)
$d_2=0.3d_1\pm3.3\%$ (FIG. 17)
$d_2=0.2d_1\pm2.3\%$ (FIG. 18)
$d_2=0.1d_1\pm1.3\%$ (FIG. 19)

Thus, when $d_2$ is $0.4d_1$ or less, there was an effect of improvement in the unevenness of chromaticity, as compared with the planar arrangement rule 3 in which the light-emitting elements 20A and 20B are not adjacently provided. When $d_2$ is $0.3d_1$ or less, it is possible to obtain an effect of the maximum point of the chromaticity distribution being not above the light-emitting elements 20A and 20B. The smaller $d_2/d_1$ is, the greater effect on the unevenness of color is brought about. On the other hand, under the same in-plane mounting density of the light-emitting elements and the same distance t, distribution of the luminous intensity (light intensity) itself tends to become slightly larger. Therefore, it is preferable that $d_2/d_1$ be set so that the unevenness is least perceivable for a person, by taking into consideration the unevenness of color and the unevenness of luminous intensity comprehensively. The distance $d_2$ can be decreased to such a degree that the light-emitting elements do not overlap each other, that is, the distance $d_2$ can be as small as the width of the light-emitting element.

As shown in FIGS. 16 through 19, the above simulation deals with an arrangement in which an alignment of the light-emitting elements 20A and 20B in one of adjacent two rows is reversed to that in the other of the adjacent two rows. Instead, an alignment of the light-emitting elements 20A and 20B in one of adjacent two rows can be the same as that in the other of the adjacent two rows. Especially, when $d_2/d_1$ is small, it is possible to obtain a substantially the same excellent outcome as this simulation.

Figure 20:
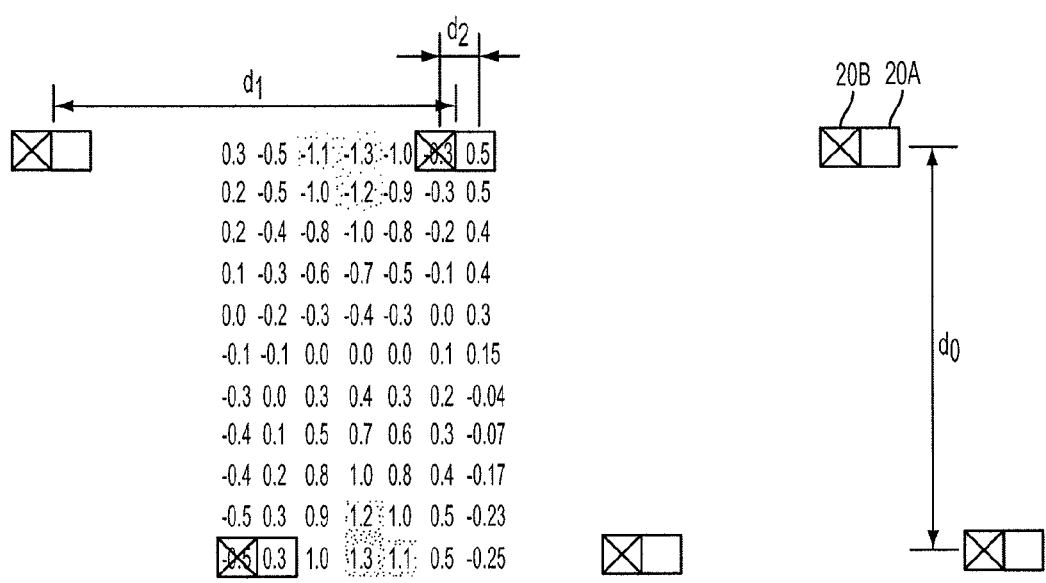
FIG. 20 is a view showing the result of two-dimensional simulation of chromaticity unevenness parameters in a planar arrangement rule 5.
Figure 20:
Figure 20:
Figure 20:
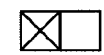

A result of two-dimensional simulation of parameters of unevenness of chromaticity in the planar arrangement rule 5 is shown in FIG. 20. In the planar arrangement rule 5, in the light-emitting elements of the four rows used in the calculation of $d_2=0.1d_1$, the first and third horizontal rows are shifted so that the pairs form an isosceles triangle. In each of the pairs of the first and third rows, the light-emitting element 20A is provided on the left side and the light-emitting element 20B is provided on the right side in the same manner as the second and fourth rows.

In this case, the range, in which the maximum value and the minimum value of the chromaticity unevenness parameters fall is as follows.

$d_2=0.1d_1\pm1.3\%$ (FIG. 20)

This result is almost the same as the planar arrangement rule shown in FIG. 19. It should be noted that the pairs can be provided so as to form an equilateral triangle, instead of an isosceles triangle.

Therefore, a planar light source using such planar arrangement rules can be suitably used as a backlight of the liquid crystal display device 90. In this case, the unevenness of color can be reduced.

It is preferable that (i) an actual value of the interval t is not less than 0.5 cm and not more than 3 cm, for example, 1.85 cm, and (ii) the distance $d_1$ between the pairs is 0.5 through 2 times the distance t. When a light emission distribution property of light-emitting elements is changed from lambertian so that most of the light is directed in the transverse direction, the distance t can be further reduced. This is suitably applicable to a flat display device.

Embodiment 3

Embodiment 3 deals with a displaying method for correcting chromaticity of a planar light source when the chromaticity differs from target white chromaticity.

(Offset Correction of Chromaticity by a Liquid Crystal Display Device)

Figure 21:
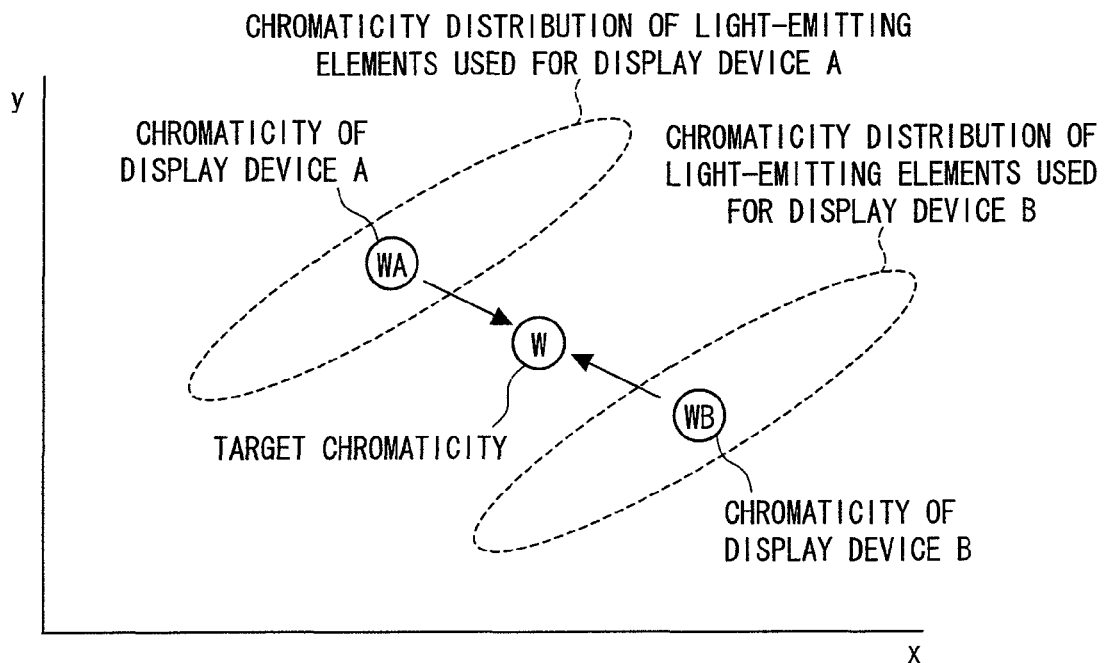
FIG. 21 is a chromaticity diagram for explaining adjustment of chromaticity of a display device in Embodiment 3.

FIG. 21 is a chromaticity diagram for explaining adjustment of the chromaticity of a liquid crystal display device. Plotted in FIG. 21 are target chromaticity W, and chromaticity WA and WB obtained when white colors are displayed by liquid crystal display device A and B, respectively, which are two samples of the liquid crystal display device 90.

At least because of the reason that mold lots of light-emitting elements constituting planar light sources which the liquid crystal display devices A and B include, respectively, are different from each other, and other reasons, the light-emitting elements to be used have different chromaticity distributions. Therefore, the chromaticity WA and WB do not coincide with the target chromaticity W.

However, when the liquid crystal display device 90 includes chromaticity correction means 93a, it is possible for the respective chromaticity WA and WB to be coincident with the target chromaticity W. For example, it is possible for the chromaticity WA to be coincident with the target chromaticity W, by carrying out the following offset correction so that transmittance of green light is reduced in the liquid crystal display device A. It is possible for the chromaticity WB to be coincident with the target chromaticity W, by carrying out the following offset correction so that transmittance of green light is increased in the liquid crystal display device B. Thus, it is possible to cause the unevenness of chromaticity between the different liquid crystal display devices to fall within a certain range.

Figure 22:
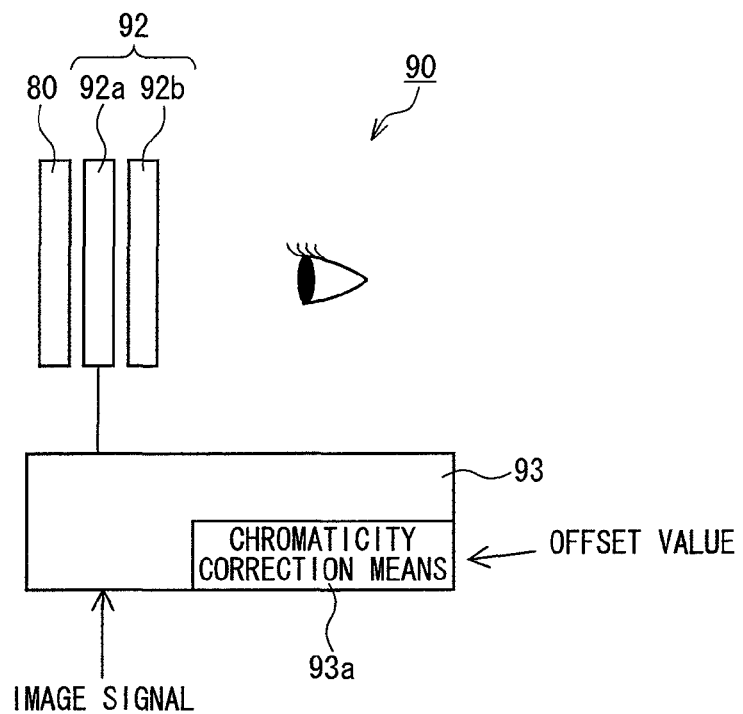
FIG. 22 is a block diagram showing how a display device of Embodiment 3 operates.

FIG. 22 is a block diagram showing how the liquid crystal display device of the present embodiment operates. A liquid crystal display panel 92 includes a liquid crystal cell 92a and a filter 92b. The liquid crystal display panel 92 is backlit by the planar light source 80. The liquid crystal cell 92a is arranged so that its light transmittance can be controlled in response to a signal supplied from a driving circuit 93. The liquid crystal cell 92a includes a plurality of electrodes. Pixels are comprised of parts of the liquid crystal cell 92a corresponding to the plurality of electrodes and parts of the filter 92b, respectively. When an electric field is applied across desired electrodes, the liquid crystal cell 92a serves as a shutter causing a change in light transmittance so that a corresponding pixel is opened or closed. The driving circuit 93 including the chromaticity correction means 93a is connected to the liquid crystal cell 92a. An image is formed in response to a signal supplied from the driving circuit 93. Further, it is possible to correct the chromaticity by changing time-average light transmittance (a ratio of opening time and closing time) of a pixel corresponding to any color.

Embodiment 4

The present embodiment deals with how light-emitting elements having different chromaticity are combined in a case where a chromaticity distribution of a population of light-emitting elements varies two-dimensionally.

Figure 23:
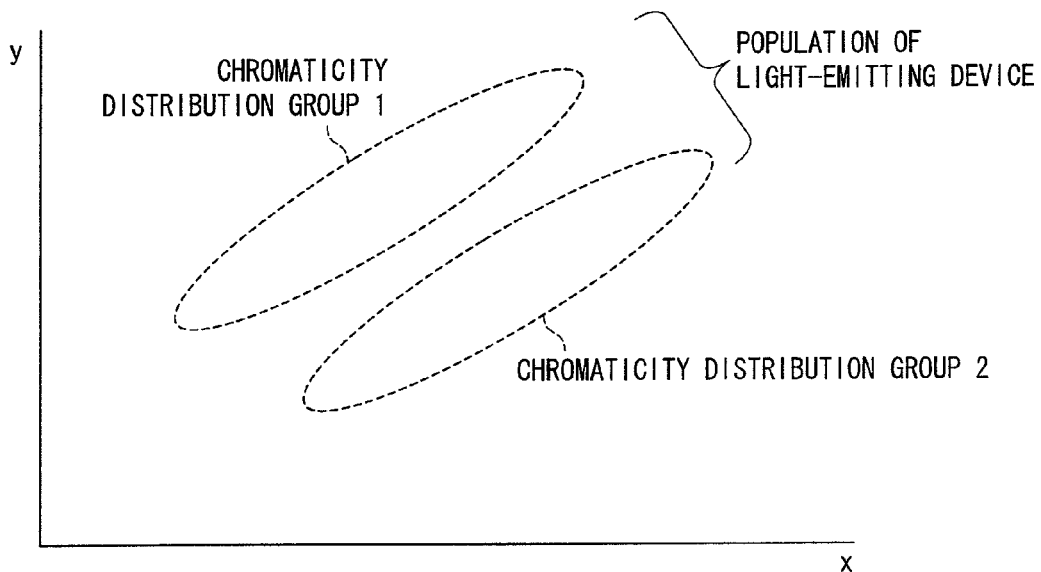
FIGS. 23 ($a$) and 23 ($b$) are chromaticity diagrams each showing a chromaticity distribution of a population of light-emitting elements in Embodiment 4.
Figure 23:
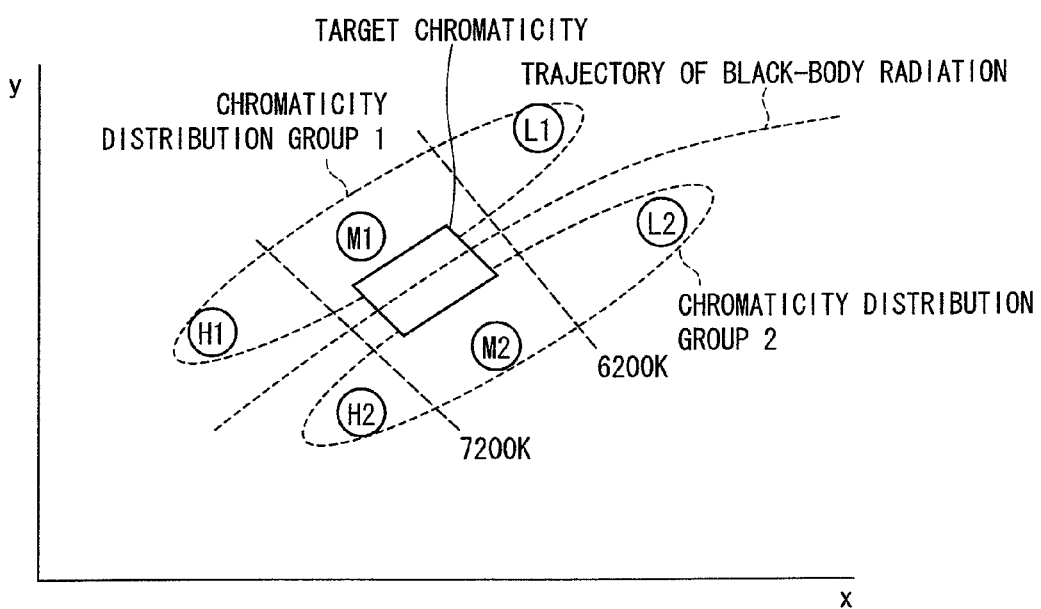

FIG. 23 is a chromaticity diagram showing a chromaticity distribution of a population of light-emitting elements. As shown in FIG. 23, two groups of chromaticity distributions each showing an upward-sloping linear distribution appear. This is partially because, for example, light-emitting elements are manufactured by using semiconductor light-emitting elements 1 and fluorescent substances 2a and 2b each belonging to a plurality of lots.

When colors of a plurality of light-emitting elements selected from the population having such chromaticity distributions are compared, for example, when colors of M1 and M2 shown in FIG. 23 (b) are compared, the color of M1 looks different from the color of M2. This is because coordinates of M1 and M2 on the chromaticity diagram are different from each other, even though color temperature of M1 is the same as that of M2. Therefore, it is necessary to combine light-emitting elements so as to compliment each other's chromaticity.

The following description deals with how to combine light-emitting elements. In the population of light-emitting elements constituting groups 1 and 2 of chromaticity distributions, light-emitting elements each having luminescence intensity falling in a certain range are selected. The selected light-emitting elements are sorted into a plurality of color temperature groups. Specifically, the selected light-emitting elements are sorted into L1, M1, H1 for the group 1, and L2, M2, and H2 for the group 2, respectively, in the order of increasing color temperature. Color temperature 6200K along the trajectory of a black-body radiation is a threshold temperature for discriminating between L1 and M1, and between L2 and M2. Color temperature 7200K along the trajectory of a black-body radiation is a threshold temperature for discriminating between M1 and H1, and between M2 and H2. It should be noted that the color temperature groups are chromaticity groups divided along the color temperature on the trajectory of the black-body radiation.

A planar light source is prepared with the use of (i) any one of combinations of L1H2, M1M2 and H1L2 and (ii) any one of the planar arrangement rules 1 through 5 described in the Embodiments 1 and 2. This causes the planar light source to have chromaticity which falls in a range of the target chromaticity.

It should be noted that the number of groups of chromaticity distributions is not limited to two. Even if the number of the groups is more than two, it is possible to realize a planar light source in which the chromaticity distributions are restrained by a method similar to the method as described above. Further, the number of the color temperature groups can be four, five, six or seven, instead of three.

Embodiment 5

In the Embodiments 1 though 4, the light-emitting elements are divided into chromaticity groups on the basis of the chromaticity (x, y) of each of the light-emitting elements. However, when light-emitting elements are used as a backlight of a liquid crystal display device, an observer sees light traveled via a filter which is provided in a liquid crystal panel. In this case, even if chromaticity is uniform as a whole, it would appear that different chromaticity of the light reaches the observer via the filter. In view of the circumstances, the present embodiment luminescence intensity of each color of each light-emitting element is divided into a plurality of groups (one kind of chromaticity groups).

Each luminescence intensity of the light emitted from each light-emitting element via a filter R, a filter G and a filter B is measured. It should be noted that sensitivity of a measuring device is set to the human visibility (a visibility correction filter is attached to a Si photo diode). The filter R, filter G and filter B have the same characteristics as red, green and blue color filters provided in a liquid crystal panel, respectively.

Figures 24, 25A, 25B, 25C:
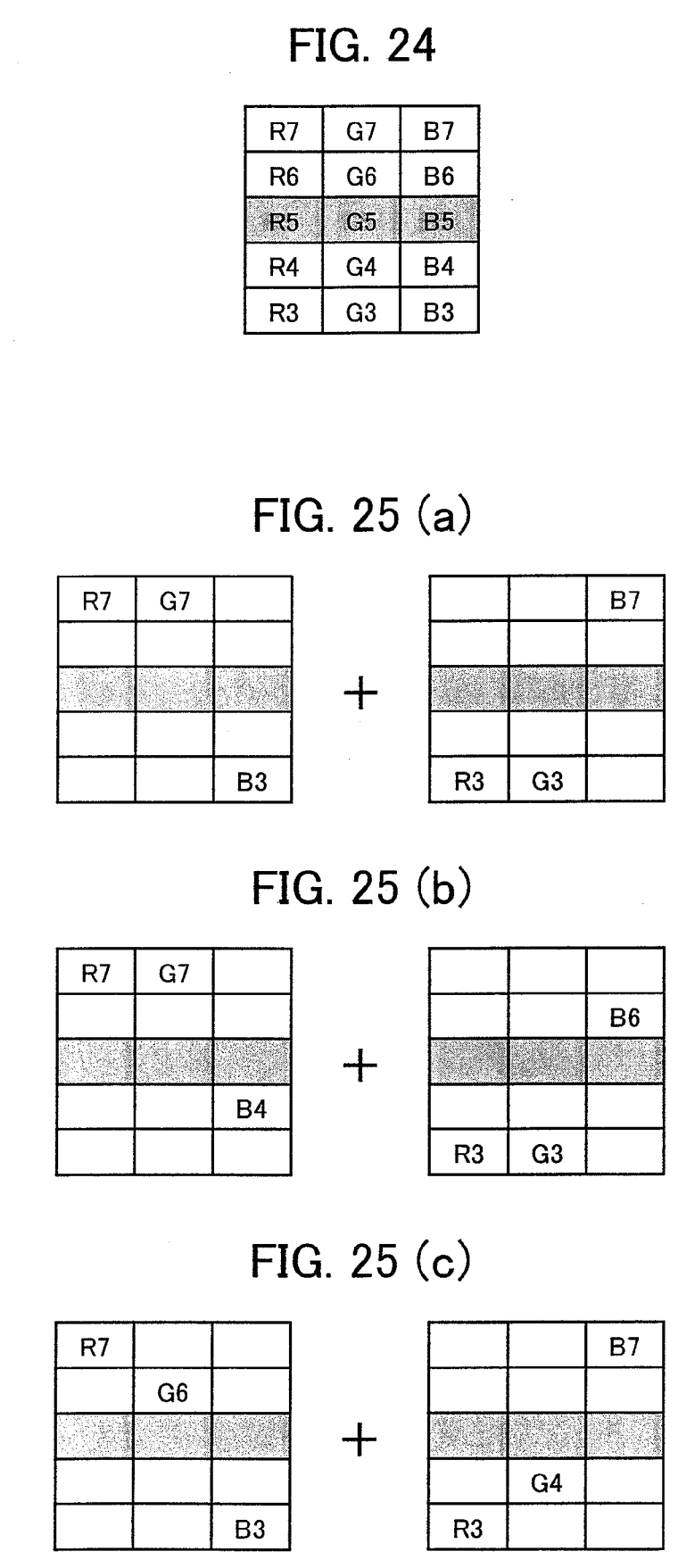

The light-emitting elements are divided into luminescence intensity groups R3, R4, R5, R6, R7 and others with no rank on the basis of the luminescence intensity of the light-emitting elements which passed through the filter R. The light-emitting elements are divided into the luminescence intensity groups G3, G4, G5, G6, G7 and others with no rank on the basis of a data measured via the filter G. The light-emitting elements are divided into the luminescence intensity groups of B3, B4, B5, B6, B7 and others with no rank on the basis of a data measured via the filter B. It should be noted that average light-emitting elements belong to the luminescence intensity groups of R5, G5 and B5. The luminescence intensity groups for the respective colors are shown in FIG. 24. Thus, light-emitting elements with some ranks belong to any one of $5^3=125$ luminescence intensity groups for the respective colors.

FIG. 25 is an explanatory view showing combinations of light-emitting elements, FIG. 25 (a) shows an example in which R7G7B3 and R3G3B7 are combined, and FIG. 25 (b) shows an example in which R7G7B4 and R3G3B6 are combined. When the density of fluorescent substances is high, there is a correlation in which (i) R and G are in conjunction with each other so that their respective intensity become high and (ii) the intensity of B becomes low. Therefore, there are a lot of light-emitting elements belonging to such luminescence intensity groups. Two RGB combinations should be carried out so that an average of the numeral values of luminescence intensity groups (7 of "R7") of two RGB combinations becomes 5.

FIG. 25 (c) shows an example of a combination in which green fluorescent substances and red fluorescent substances are slightly unbalanced. Also in this case, the two RGB combinations has an average of the numeral values of luminescence intensity groups of the two RGB combinations becomes 5.

The description has dealt with the example in which light-emitting elements are divided into a plurality of groups in accordance with their luminescence intensity. However, the present embodiment is not limited to this. Namely, instead of the division into the luminescence intensity groups, it is possible to select and combine (i) light-emitting elements having first numeral values of luminescence intensity measured for R, G and B and (ii) light-emitting elements having second numeral values of luminescence intensity measured for R, G and B. The differences between the first numeral values and target values are close to the differences between the second numerals values and the target values, respectively. The first numeral values are opposite to the second numeral values with respect to the target values, respectively.

When light-emitting elements having the two RGB combinations thus prepared are provided in accordance with any one of the planar arrangement rules described in the present specification, it is possible to realize light-emitting elements in which their in-plane distribution of chromaticity is restrained.

Embodiment 6

The present embodiment relates to an improvement in yield of a planar light source for lighting.

It is necessary to use light-emitting elements having color temperature of (6500K±200K), when a planar light source having a certain color temperature, for example, a planar light source having a color temperature of (6500K±200K) is prepared by arranging a plurality of light-emitting elements. However, in the production field, even if the producer tries to prepare light-emitting elements having a color temperature of 6500K, there is unevenness of color temperature among produced plural light-emitting elements. Therefore, it is necessary that the unevenness of color temperature among produced light-emitting elements falls within a range (centered at 6500K) of (6500K±200K). Especially, when a white lighting module (planar light source for lighting) is prepared, hundreds of light-emitting elements are used. As such, the preparation of such a white lighting module is susceptible to the unevenness of production.

The inventors of the present invention studied in detail and found out that it was very difficult to cause the unevenness of color temperature among the produced light-emitting elements to fall within such a range of (6500K±200K). This is because in the production process, there were unevenness of emission wavelength among semiconductor light-emitting elements, unevenness of emission wavelength among fluorescent substances, unevenness of amount among resins, unevenness of compounding ratio among fluorescent substances and unevenness of preparation time. For such reasons, light-emitting elements whose color temperature do not fall within the range of (6500K±200K) are judged as defective products. This gives rise to the reality that planar light sources can not be prepared with good process yield. Further, the yield becomes lower, as the target color temperature of a planar light source becomes narrower, for example, as X of (6500K±XK) becomes smaller.

EXAMPLE 1

Used as a light-emitting element 302 was a light-emitting element 10, provided that yellow fluorescent substances 2, which is dispersed in the resin 3, includes $2(Sr_{0.93}Ba_{0.05}Eu_{0.02})O.SiO_2$.

Figure 26:
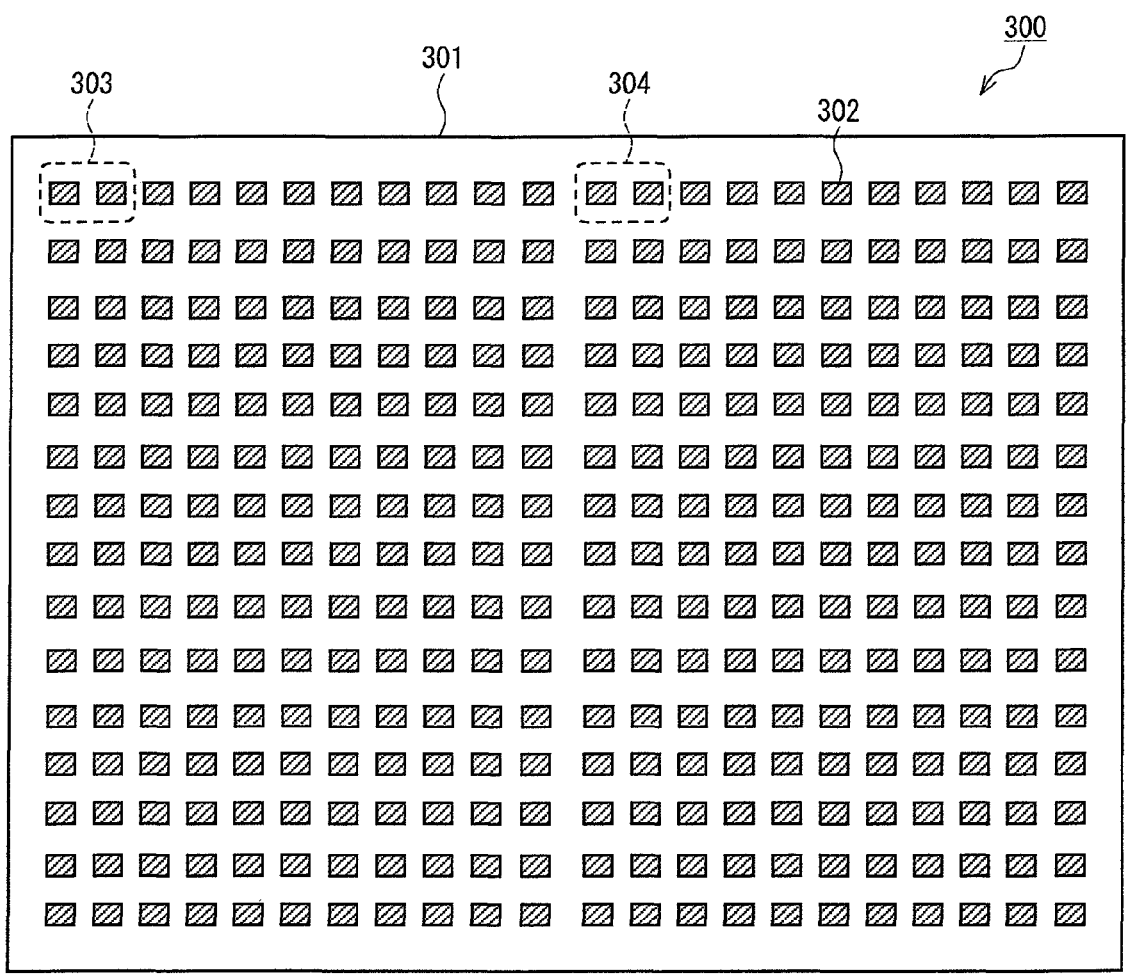
FIG. 26 is a top schematic view of a planar light source of Example 1 and Example 4.

FIG. 26 shows a top schematic view of a planar light source 300. 22×15 light-emitting elements 302 are provided, in accordance with the planar arrangement rule 1, on a glass-epoxy substrate 301 having a rectangular shape. Further, the planar light source 300 is arranged to include pairs of arbitrary two light-emitting elements (e.g. 303 and 304 shown in FIG. 26).

It was assumed that a target color temperature of the planar light source 300 was 6500K, and an allowable range was from 6200K to 7200K. An amount of the fluorescent substances, dispersed into each of the light-emitting elements 302 used in the planar light source 300, was adjusted so that the color temperature of emission color was 6500K. However, the unevenness of color temperature among the light-emitting elements was caused during the production. In view of the circumstances, the light-emitting elements 302 provided in accordance with the planar arrangement rule 1 were divided into three color temperature groups 1 through 3 (chromaticity groups divided along on the color temperature on the trajectory of the black-body radiation) on the basis of color temperature Tc of emission color. In the color temperature group 1, light-emitting elements have their emission color whose color temperatures fall a range of not less than 6200K and less than 7200K, in the color temperature group 2, light-emitting elements have their emission color whose color temperatures fall a range of not less than 7200K, and in the color temperature group 3, light-emitting elements have their emission color whose color temperatures fall a range of less than 6200K. Each of the pairs of two light-emitting elements is definitely comprised of (i) two light-emitting elements belonging to the color temperature group 1 or (ii) one light-emitting element belonging to the color temperature group 2 and one light-emitting element belonging to the color temperature group 3.

Figure 27:
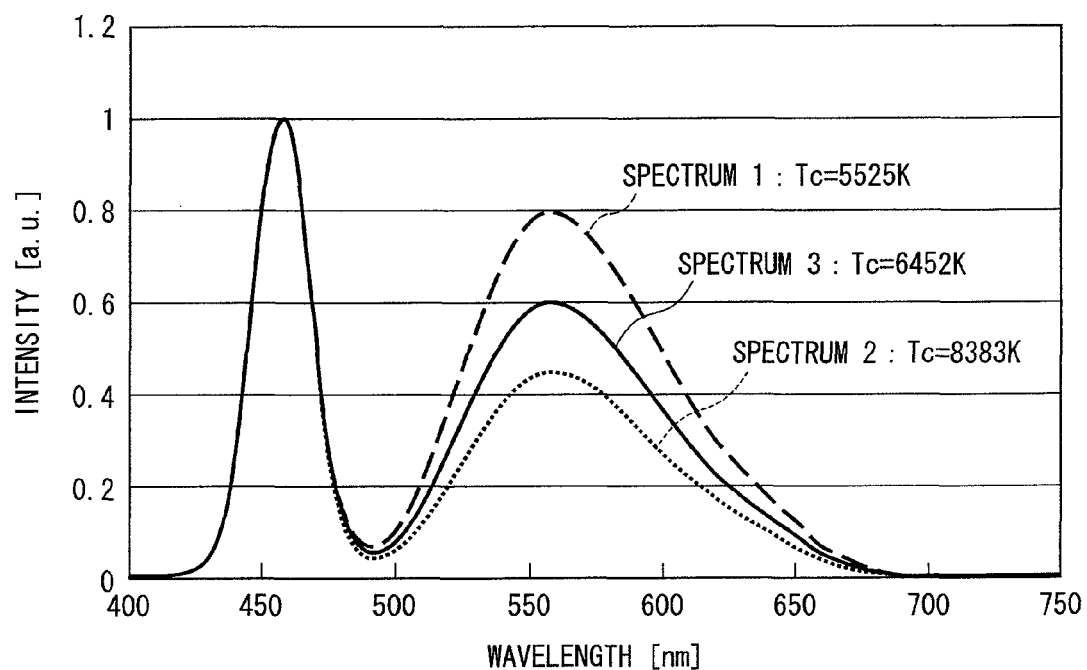
FIG. 27 is a graph showing a spectrum of light emitted from a pair 303 of Example 1.

Specifically, the pair 303 was comprised of one light-emitting element belonging to the color temperature group 2 and one light-emitting element belonging to the color temperature group 3. FIG. 27 shows emission spectra of the light-emitting elements belonging to the respective color temperature groups. In FIG. 27, a spectrum 1 is a spectrum of the light-emitting elements belonging to the color temperature group 3, and their color temperatures were 5525K. In FIG. 27, a spectrum 2 is a spectrum of the light-emitting elements belonging to the color temperature group 2, and their color temperatures were 8383K. When the emission spectrum was measured while only the two light-emitting elements of the pair 303 were being turned on, a spectrum 3 in FIG. 27 was obtained. Their color temperatures were 6452K. It is clear that the spectrum 3 has emission spectrum and color temperature which are an average of those of the two light-emitting elements.

Figure 28:
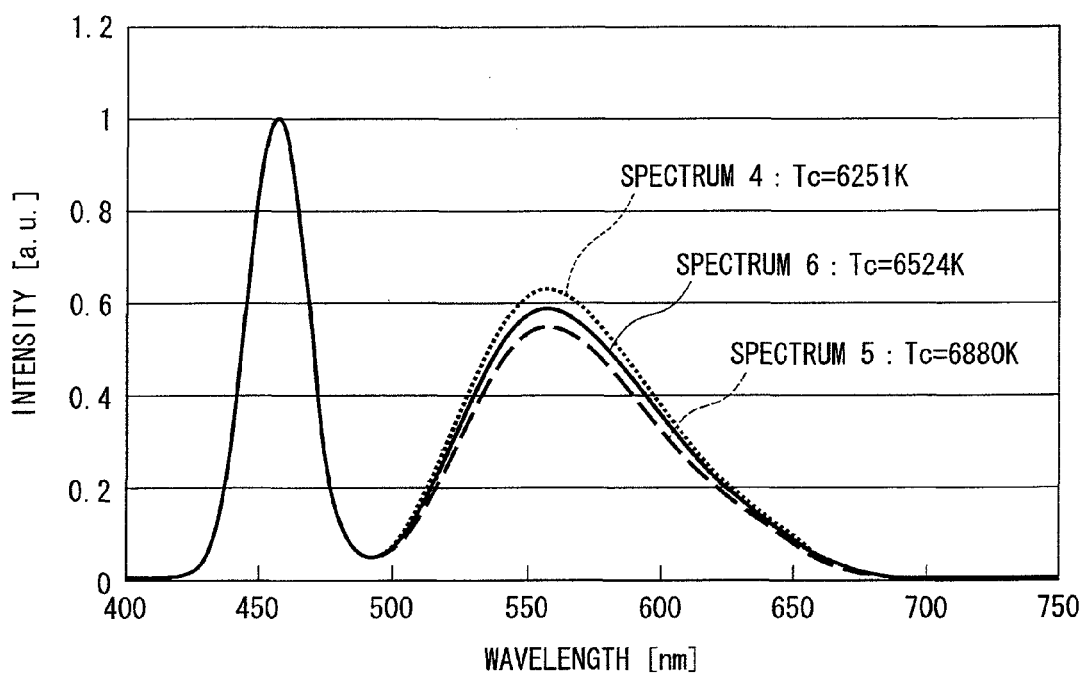
FIG. 28 is a graph showing a spectrum of light emitted from a pair 304 of Example 1.

The pair 304 was comprised of two light-emitting elements belonging to the color temperature group 1. FIG. 28 shows emission spectra of the light-emitting elements. In FIG. 28, spectra 4 and 5 are, respectively, spectra of the two light-emitting elements, and their color temperatures were 6251K and 6880K, respectively. When the emission spectrum was measured while only the two light-emitting elements of the pair 304 were being turned on, a spectrum 6 in FIG. 28 was obtained. Their color temperatures were 6524K.

Figure 29:
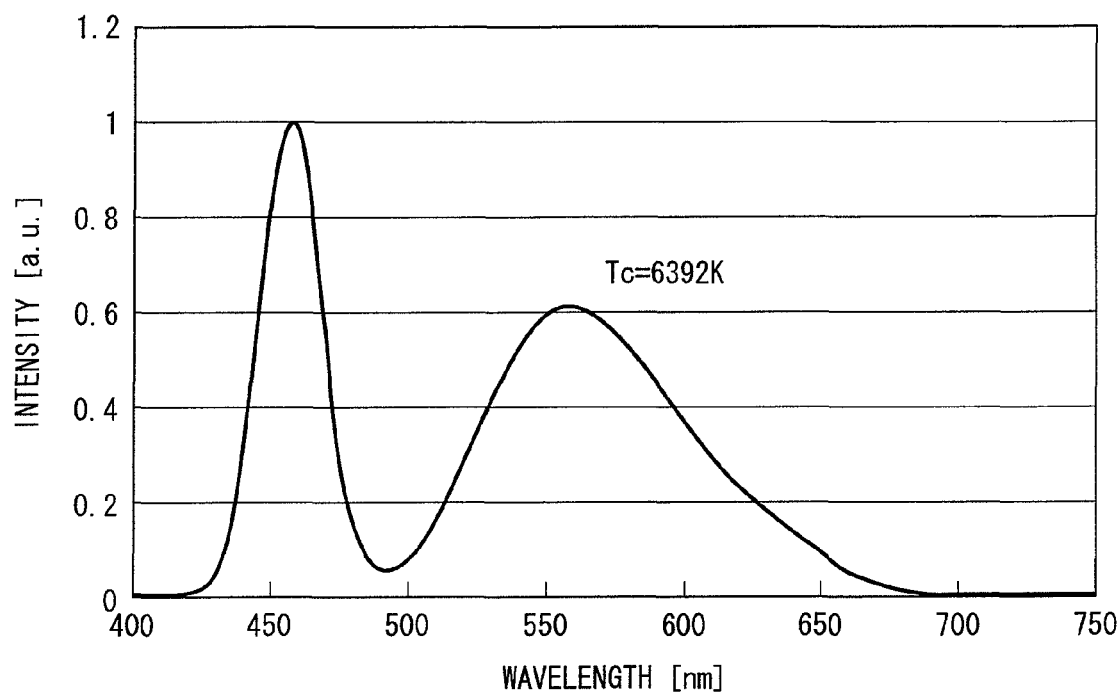
FIG. 29 is a graph showing a spectrum of light emitted from the planar light source of Example 1.

FIG. 29 shows an emission spectrum measured while the whole light-emitting elements of the planar light source 300 thus prepared were being turned on. The color temperature was 6392K. This slightly deviates from the target color temperature of the planar light source, but fell within an allowable color temperature range.

As described above, even though light-emitting elements whose color temperatures have deviated from each other during the production process, it is possible to prepare a planar light source having a target color temperature, when such light-emitting elements are provided in accordance with an ingenious arrangement method of the present invention. This is because the ingenious arrangement method allows the color temperature of such light-emitting elements to be averaged. According to Example 1, it was possible to use light-emitting elements whose color temperatures fall in a range from 5000K to 9000K, and the yield of the light-emitting elements was 99%.

COMPARATIVE EXAMPLE 1

Light-emitting elements used in Comparative Example 1 all belong to the color temperature group 1 of the Example 1. The light-emitting elements were not divided and were simply provided in an array shape. There is no difference from the Example 1 except this.

Figure 30:
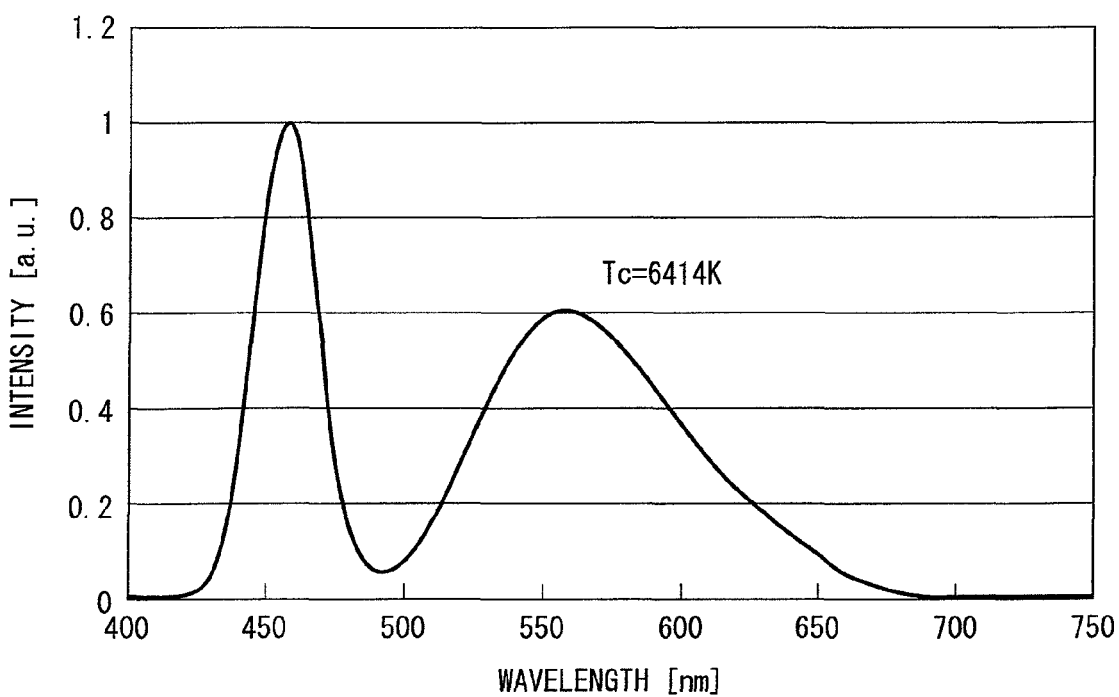
FIG. 30 is a graph showing a spectrum of light emitted from a planar light source of Comparative Example 1.

FIG. 30 shows an emission spectrum measured while whole of the light-emitting elements of the planar light source 300, thus prepared, of the Comparative Example 1 is being turned on. The color temperature was 6414K. This slightly deviates from the target color temperature of the planar light source, but falls within the allowable color temperature range. In the Comparative Example 1, only light-emitting elements whose color temperatures fall in a range from 6200K to 7200K were used. Therefore, the yield of the light-emitting elements was 85%.

EXAMPLE 2

Used as a light-emitting element 502 was a light-emitting element 10, provided that green fluorescent substances 2a and red fluorescent substances 2b, which are dispersed in the resin 3, include $(Ca_{0.9}Mg_{0.1})_3(Sc_{0.90}Ce_{0.10})_2(SiO4)_3$ and $(Ca_{0.98}Eu_{0.02})AlSiN_3$, respectively. A wavelength conversion section was prepared by dispersing a mixture of the green fluorescent substances 2a and the red fluorescent substances 2b into the silicon resin 3. Thus, a planar light source 500 of Example 2 was prepared.

Figure 31:
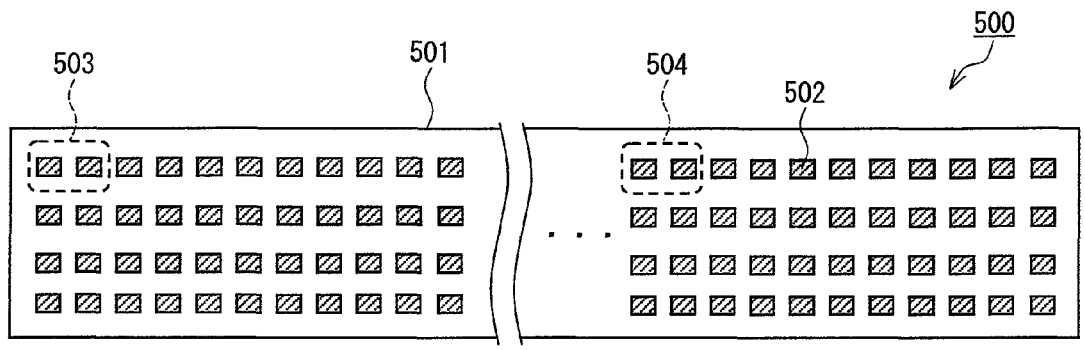
FIG. 31 is a top schematic view of a planar light source of Example 2.

FIG. 31 shows a top schematic view of a planar light source 500. 75×4 light-emitting elements 502 are provided, in accordance with the planar arrangement rule 1, on a glass-epoxy substrate 501 having a linear shape. Further, the planar light source 500 is arranged to include pairs of arbitrary two light-emitting elements (e.g. 503 and 504 shown in FIG. 31).

It was assumed that a target color temperature of the planar light source 500 was 5000K, and an allowable range was from 4700K to 5300K. The light-emitting elements 502 provided in accordance with the planar arrangement rule 1 were divided into three color temperature groups 1 through 3 (chromaticity groups divided along on the color temperature on the trajectory of the black-body radiation) on the basis of color temperature Tc of emission color. In the color temperature group 1, light-emitting elements have their emission color whose color temperatures fall a range of not less than 4700K and less than 5300K, in the color temperature group 2, light-emitting elements have their emission color whose color temperatures fall a range of not less than 5300K, and in the color temperature group 3, light-emitting elements have their emission color whose color temperatures fall a range of less than 4700K. Each of the pairs of two light-emitting elements is definitely comprised of (i) two light-emitting elements belonging to the color temperature group 1 or (ii) one light-emitting element belonging to the color temperature group 2 and one light-emitting element belonging to the color temperature group 3.

Specifically, the pair 503 was comprised of one light-emitting element belonging to the color temperature group 2 and one light-emitting element belonging to the color temperature group 3. The pair 504 was comprised of two light-emitting elements belonging to the color temperature group 1.

COMPARATIVE EXAMPLE 2

Light-emitting elements and a planar light source were manufactured in the same way as the Example 2. Like the Example 2, the 75×4 light-emitting elements were simply provided in an array shape on the glass-epoxy substrate 501 having a linear shape. Because the target color temperature of the planar light source was 5000K, and the allowable color temperature was from 4700K to 5300K, light-emitting elements used in Comparative Example 2 all belong to the color temperature group 1 of the Example 2.

EXAMPLE 3

Used as a light-emitting element 602 was a light-emitting element 10, provided that green fluorescent substances 2a and red fluorescent substances 2b, which are dispersed in the resin 3, include $2(Ba_{0.65}Sr_{0.33}Eu_{0.02})O.SiO_2$ and $(Ca_{0.98}Eu_{0.02})AlSiN_3$, respectively. A wavelength conversion section was prepared by dispersing a mixture of the green fluorescent substances 2a and the red fluorescent substances 2b into the silicon resin 3. Thus, a planar light source 600 of Example 3 was prepared.

Figure 32:
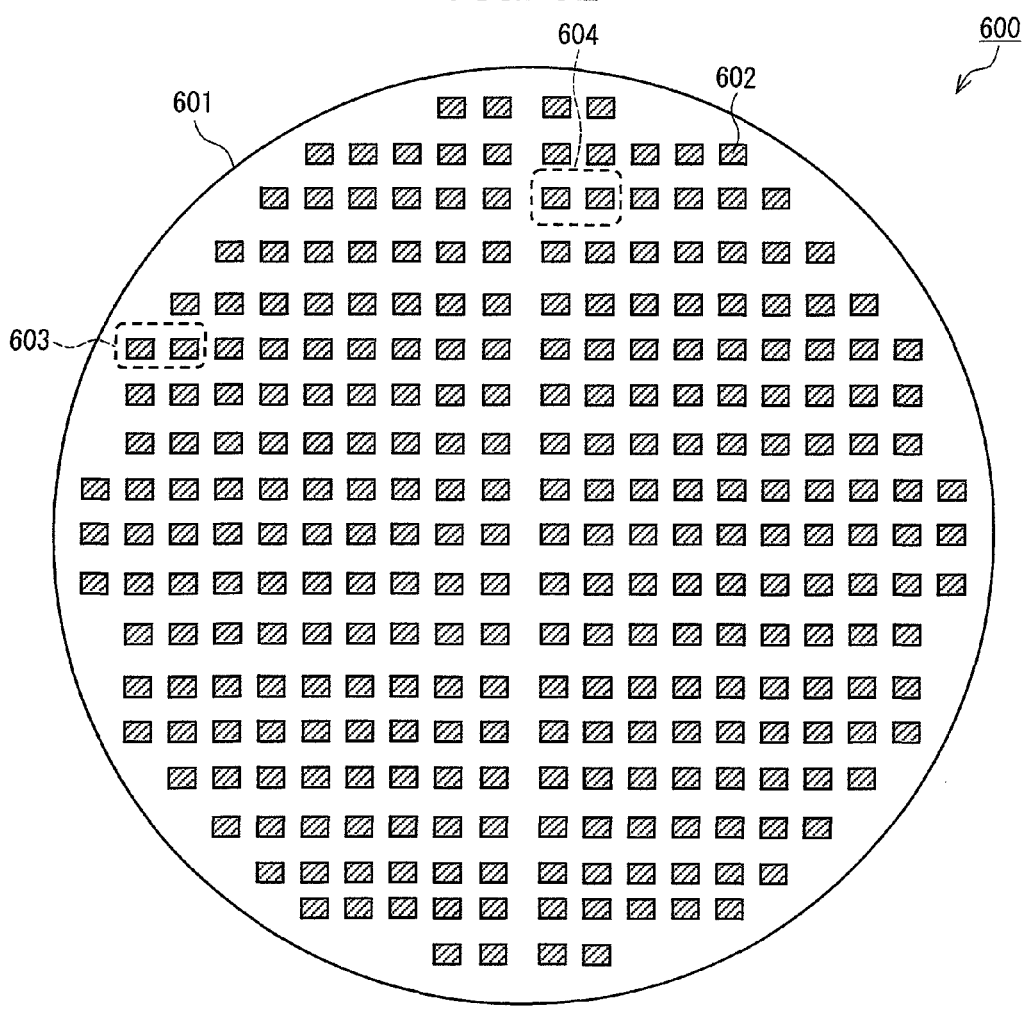
FIG. 32 is a top schematic view of a planar light source of Example 3.

FIG. 32 shows a top schematic view of the planar light source 600. 280 light-emitting elements 602 are provided, in accordance with the planar arrangement rule 1, on a glass-epoxy substrate 601 having a circular shape. Further, the planar light source 600 is arranged to include pairs of arbitrary two light-emitting elements (e.g. 603 and 604 shown in FIG. 32).

It was assumed that a target color temperature of the planar light source 600 was 2500K, and an allowable range was from 2300K to 2700K. The light-emitting elements 602 provided in accordance with the planar arrangement rule 1 were divided into three color temperature groups 1 through 3 (chromaticity groups divided along on the color temperature on the trajectory of the black-body radiation) on the basis of color temperature Tc of emission color. In the color temperature group 1, light-emitting elements have their emission color whose color temperatures fall a range of not less than 2300K and less than 2700K, in the color temperature group 2, light-emitting elements have their emission color whose color temperatures fall a range of not less than 2700K, and in the color temperature group 3, light-emitting elements have their emission color whose color temperatures fall a range of less than 2300K. Each of the pairs of two light-emitting elements is definitely comprised of (i) two light-emitting elements belonging to the color temperature group 1 or (ii) one light-emitting element belonging to the color temperature group 2 and one light-emitting element belonging to the color temperature group 3.

Specifically, the pair 603 was comprised of one light-emitting element belonging to the color temperature group 2 and one light-emitting element belonging to the color temperature group 3. The pair 604 was comprised of two light-emitting elements belonging to the color temperature group 1.

COMPARATIVE EXAMPLE 3

Light-emitting elements and a planar light source were manufactured in the same way as the Example 3. Like the Example 3, the 280 light-emitting elements were simply provided in an array shape on the glass-epoxy substrate 601 having a circular shape. Because the target color temperature of the planar light source was 2500K, and the allowable color temperature was from 2300K to 2700K, light-emitting elements used in Comparative Example 3 all belong to the color temperature group 1 of the Example 3.

EXAMPLE 4

Used as a light-emitting element 302 was a light-emitting element 10, provided that green fluorescent substances 2a and red fluorescent substances 2b, which are dispersed in the resin 3, include $(Ca_{0.9}Mg_{0.1})_3(Sc_{0.90}Ce_{0.10})_2(SiO4)_3$ and $(Ca_{0.98}Eu_{0.02})AlSiN_3$, respectively. A wavelength conversion section was prepared by dispersing a mixture of the green fluorescent substances 2a and the red fluorescent substances 2b into the silicon resin 3. Thus, a planar light source of Example 4 was prepared.

Like the example 1, 22×15 light-emitting elements 302 are provided, in accordance with the planar arrangement rule 1, on a glass-epoxy substrate 301 having a rectangular shape (see FIG. 26). Further, the planar light source is arranged to include pairs of arbitrary two light-emitting elements (e.g. 303 and 304 shown in FIG. 26).

It was assumed that a target color temperature of the planar light source was 3000K, and an allowable range was from 2500K to 3600K. The light-emitting elements 302 provided in accordance with the planar arrangement rule 1 were divided into three color temperature groups 1 through 3 (chromaticity groups divided along on the color temperature on the trajectory of the black-body radiation) on the basis of color temperature Tc of emission color. In the color temperature group 1, light-emitting elements have their emission color whose color temperatures fall a range of not less than 2800K and less than 3200K, in the color temperature group 2, light-emitting elements have their emission color whose color temperatures fall a range of not less than 3200K, and in the color temperature group 3, light-emitting elements have their emission color whose color temperatures fall a range of less than 2800K. Each of the pairs of two light-emitting elements is definitely comprised of (i) two light-emitting elements belonging to the color temperature group 1 or (ii) one light-emitting element belonging to the color temperature group 2 and one light-emitting element belonging to the color temperature group 3.

Specifically, the pair 303 was comprised of one light-emitting element belonging to the color temperature group 2 and one light-emitting element belonging to the color temperature group 3. The pair 304 was comprised of two light-emitting elements belonging to the color temperature group 1.

COMPARATIVE EXAMPLE 4

Light-emitting elements and a planar light source were manufactured in the same way as the Example 4. Like the Example 4, the 22×15 light-emitting elements 302 were simply provided in an array shape on the glass-epoxy substrate 301 having a rectangular shape. Because the target color temperature of the planar light source was 3000K, and the allowable color temperature was from 2800K to 3200K, light-emitting elements used in Comparative Example 4 all belong to the color temperature group 1 of the Example 4.

The evaluation result of characteristics of the planar light sources of Examples 1 through 4 and Comparative Examples 1 through 4 is shown in Table 1.

TABLE 1

| | Dominant Wavelength of light-emitting element B | Fluorescent substance | Color temperature range of used light-emitting element | The number of array | Color temperature of Light-emitting device | Light flux | General color rendering index (Ra) | Yield of light-emitting element |
|---|---|---|---|---|---|---|---|---|
| Example 1 | 457 nm | Yellow: $2(Sr_{0.92}Ba_{0.06}Eu_{0.02})O \cdot SiO_2$ | 5000 K-9000 K | Rectangular shape 300 20 × 15 | 6392 K | 2026 | 74 | 99% |
| Comparative Example 1 | 457 nm | Yellow: $2(Sr_{0.92}Ba_{0.06}Eu_{0.02})O \cdot SiO_2$ | 6200 K-7200 K | Rectangular shape 300 20 × 15 | 6414 K | 2031 | 72 | 85% |
| Example 2 | 457 nm | Red: $(Ca_{0.98}Eu_{0.02})AlSiN_3$ green: $(Ca_{0.9}Mg_{0.1})_3(Sc_{0.90}Ce_{0.10})_2(SiO_4)_3$ | 4200 K-6000 K | Linear shape 300 4 × 75 | 5035 K | 1522 | 92 | 99% |

TABLE 1-continued

| | Dominant Wavelength of light-emitting element B | Fluorescent substance | Color temperature range of used light-emitting element | The number of array | Color temperature of Light-emitting device | Light flux | General color rendering index (Ra) | Yield of light-emitting element |
|---|---|---|---|---|---|---|---|---|
| Comparative Example 2 | 457 nm | Red: $(Ca_{0.98}Eu_{0.02})AlSiN_3$ green: $(Ca_{0.9}Mg_{0.1})_3(Sc_{0.90}Ce_{0.10})_2(SiO_4)_3$ | 4700 K-5300 K | Linear shape 300 4 × 75 | 5082 K | 1513 | 91 | 83% |
| Example 3 | 457 nm | Red: $(Ca_{0.98}Eu_{0.02})AlSiN_3$ green: $2(Ba_{0.65}Sr_{0.33}Eu_{0.02})O \cdot SiO_2$ | 2000 K-3000 K | Circular shape 300 | 2493 K | 1311 | 72 | 99% |
| Comparative Example 3 | 457 nm | Red: $(Ca_{0.98}Eu_{0.02})AlSiN_3$ green: $2(Ba_{0.65}Sr_{0.33}Eu_{0.02})O \cdot SiO_2$ | 2300 K-2700 K | Circular shape 300 | 2470 K | 1340 | 70 | 82% |
| Example 4 | 457 nm | Red: $(Ca_{0.98}Eu_{0.02})AlSiN_3$ green: $(Ca_{0.9}Mg_{0.1})_3(Sc_{0.90}Ce_{0.10})_2(SiO_4)_3$ | 2500 K-3600 K | Rectangular shape 300 20 × 15 | 3092 K | 1198 | 90 | 99% |
| Comparative Example 4 | 457 nm | Red: $(Ca_{0.98}Eu_{0.02})AlSiN_3$ green: $(Ca_{0.9}Mg_{0.1})_3(Sc_{0.90}Ce_{0.10})_2(SiO_4)_3$ | 2800 K-3200 K | Rectangular shape 300 20 × 15 | 2984 K | 1180 | 89 | 81% |

It should be noted that brightness was obtained by turning on a planar light source under the condition that a forward current (IF) is 20 mA and by converting white lights from the planar light source into a photocurrent. Further, Tc and the general color rendering index (Ra) was obtained by turning on a planar light source under the condition that a forward current (IF) is 20 mA and by measuring white light from the planar light source with MCPD-2000 made by Otsuka Electronics Co., Ltd.

As shown in Table 1, as compared with the Comparative Examples, it is possible for the planar light sources of the Examples to widen the chromaticity range of light-emitting elements without causing a deviation in color temperature of the planar light sources and without greatly declining the light flux and the color rendering. Therefore, it is possible to remarkably increase the yield of products.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A planar light source comprising a plurality of light-emitting elements, wherein:
   each of the plurality of light-emitting elements is comprised of a combination of a semiconductor light-emitting element for emitting primary light and fluorescent substances for absorbing the primary light and emitting secondary light having a longer wavelength than the primary light, each of the plurality of light-emitting elements emitting combination light of the primary light and the secondary light,
   said each of the plurality of light-emitting elements, provided in at least a partial area of the planar light source, belongs to a first chromaticity group or a second chromaticity group on a basis of chromaticity of the combination light,
   (i) a difference between chromaticity of light-emitting elements belonging to the first chromaticity group and a target chromaticity and (ii) a difference between chromaticity of light-emitting elements belonging to the second chromaticity group and the target chromaticity are substantially equal and are away from the target chromaticity in directions reverse to each other, respectively, and
   the light-emitting elements belonging to the first chromaticity group and the light-emitting elements belonging to the second chromaticity group are alternately provided, in said at least a partial area, in a longitudinal direction and a transverse direction, respectively.

2. The planar light source according to claim 1, wherein:
   intervals at which the light-emitting elements provided in the transverse direction are shorter than intervals at which the light-emitting elements are provided in the longitudinal direction.

3. The planar light source according to claim 1, wherein:
   the plurality of light-emitting elements belong to one of more than three chromaticity groups on a basis of chromaticity of the combination light,
   the planar light source, further comprising:
   a first area in which (i) light-emitting elements, belonging to a first chromaticity group, which are selected from said more than three chromaticity groups and (ii) light-emitting elements, belonging to a second chromaticity group, which are selected from said more than three chromaticity groups are alternately provided in a transverse direction and in a longitudinal direction, respectively, and
   (i) a difference between chromaticity of light-emitting elements belonging to the first chromaticity group and a target chromaticity and (ii) a difference between chromaticity of light-emitting elements belonging to the second chromaticity group and the target chromaticity are substantially equal and are away from the target chromaticity in directions reverse to each other, respectively, and
   a second area in which light-emitting elements, which do not belong to the first and second chromaticity groups, are provided.

4. The planar light source according to claim 3, wherein:
the planar light source includes at least the first area near its periphery and the second area near its center, and
a difference in chromaticity between the first and second chromaticity groups in the first area is larger than that between the light-emitting elements in the second area.

5. The planar light source according to claim 4, further including a third area between the first area and the second area,
the third area including a plurality of light-emitting elements belonging to two chromaticity groups,
the two chromaticity groups having a difference in chromaticity which is (i) smaller than the difference in chromaticity between the first and second chromaticity groups to which the light-emitting elements constituting the first area belong and (ii) larger than the difference in chromaticity between the chromaticity groups to which the light-emitting elements constituting the second area belong.

6. The planar light source according to claim 1, wherein:
the fluorescent substances are green fluorescent substances having an emission peak at a wavelength of green light and red fluorescent substances having an emission peak at a wavelength of red light.

7. The planar light source according to claim 1, wherein:
the chromaticity groups are divided along a color temperature on a trajectory of a black-body radiation.

8. A display device comprising a planar light source recited in claim 1 and a display panel for displaying an image by driving a plurality of passive pixels,
wherein the planar light source illuminates the display panel.

9. The display device according to claim 8, wherein the display panel is a liquid crystal display panel.

10. The display device according to claim 9, further comprising:
chromaticity correction means for driving the liquid crystal display panel, and
the chromaticity correction means correcting a deviation of chromaticity of light emitted from the planar light source from set chromaticity of the display device at a time of driving the liquid crystal display panel.

11. A planar light source comprising a plurality of light-emitting elements, wherein:
each of the plurality of light-emitting elements is comprised of a combination of a semiconductor light-emitting element for emitting primary light and fluorescent substances for absorbing the primary light and emitting secondary light having a longer wavelength than the primary light, each of the plurality of light-emitting elements emitting combination light of the primary light and the secondary light,
said each of the plurality of light-emitting elements, provided in at least a partial area of the planar light source, belongs to a first chromaticity group or a second chromaticity group on a basis of chromaticity of the combination light,
(i) a difference between chromaticity of light-emitting elements belonging to the first chromaticity group and a target chromaticity and (ii) a difference between chromaticity of light-emitting elements belonging to the second chromaticity group and the target chromaticity are substantially equal and are away from the target chromaticity in directions reverse to each other, respectively, and
pairs of two of the light-emitting elements belonging to the first and second chromaticity groups, respectively are provided, in said at least a partial area, so that intervals at which two of the light-emitting elements in each of the pairs are provided are less than 0.5 times as long as intervals at which the pairs are provided.

12. The planar light source according to claim 11, wherein:
the intervals at which two of the light-emitting elements in each of the pairs are provided are less than 0.3 times as long as the intervals at which the pairs are provided.

13. The planar light source according to claim 11, wherein:
the pairs are provided in a transverse direction, and
(i) a light-emitting element, belonging to the first chromaticity group, in a first pair of the pairs provided in a transverse direction and (ii) a light-emitting element, belonging to the second chromaticity group, in a second pair adjacent to the first pair are provided so as to be close to each other.

14. The planar light source according to claim 13, wherein the pairs are provided in the transverse direction and in a longitudinal direction,
(i) a light-emitting element, belonging to the first chromaticity group, in a first pair of the pairs provided in a transverse direction and (ii) a light-emitting element, belonging to the second chromaticity group, in a second pair adjacent to the first pair are provided so as to be close to each, and
(i) a light-emitting element, belonging to the first chromaticity group, in a first pair of the pairs provided in the longitudinal direction and (ii) a light-emitting element, belonging to the second chromaticity group, in a second pair adjacent to the first pair are provided so as to be opposite to each other.

15. The planar light source according to claim 11, wherein:
the fluorescent substances are green fluorescent substances having an emission peak at a wavelength of green light and red fluorescent substances having an emission peak at a wavelength of red light.

16. The planar light source according to claim 11, wherein:
the chromaticity groups are divided along a color temperature on a trajectory of a black-body radiation.

17. A display device comprising a planar light source recited in claim 3 and a display panel for displaying an image by driving a plurality of passive pixels,
wherein the planar light source illuminates the display panel.

18. The display device according to claim 17, wherein the display panel is a liquid crystal display panel.

19. The display device according to claim 18, further comprising:
chromaticity correction means for driving the liquid crystal display panel, and
the chromaticity correction means correcting a deviation of chromaticity of light emitted from the planar light source from set chromaticity of the display device at a time of driving the liquid crystal display panel.

20. A method for manufacturing a planar light source, comprising the steps of:
preparing a plurality of light-emitting elements,
measuring light emitted from the light-emitting elements via red, green and blue filters,
dividing the light-emitting elements into red, green and blue luminescence intensity groups, for each luminescence intensity group, based on differences between their luminescence intensity and target luminescence intensity, respectively, and alternately providing light-emitting elements selected from two of the plurality of luminescence intensity groups in a longitudinal direction and in a transverse direction, respectively, the light-emitting elements being selected in a manner such that differences between luminescence intensity of the light-emitting elements and the target luminescence intensity are substantially equal and are away from the target luminescence intensity in directions reverse to each other, respectively.

21. A method for manufacturing a liquid crystal display device whose backlight is a planar light source recited in claim 20,
wherein the red, green and blue filters used in the measurement step has the substantially same characteristic as red, green and blue filters used in the liquid crystal display device, respectively.

* * * * *